(12) United States Patent
Hirabayashi et al.

(10) Patent No.: US 11,424,663 B2
(45) Date of Patent: Aug. 23, 2022

(54) MOTOR

(71) Applicant: Minebea Mitsumi Inc., Nagano (JP)

(72) Inventors: Koichiro Hirabayashi, Hirakata (JP); Akiko Ikuta, Fukuroi (JP); Yukimasa Matsumura, Kikugawa (JP); Kazuaki Sato, Yonago (JP); Minoru Kuroda, Sakaiminato (JP); Bora In, Yonago (JP)

(73) Assignee: MINEBEA MITSUMI INC., Nagano (JP)

( * ) Notice: Subject to any disclaimer, the term of this patent is extended or adjusted under 35 U.S.C. 154(b) by 195 days.

(21) Appl. No.: 15/693,881

(22) Filed: Sep. 1, 2017

(65) Prior Publication Data

US 2018/0069458 A1  Mar. 8, 2018

(30) Foreign Application Priority Data

Sep. 2, 2016  (JP) ............................. JP2016-172048

(51) Int. Cl.
*H02K 5/14*  (2006.01)
*H02K 13/10*  (2006.01)
(Continued)

(52) U.S. Cl.
CPC ........... *H02K 13/10* (2013.01); *H01R 39/381* (2013.01); *H02K 5/145* (2013.01); *H02K 5/24* (2013.01); *H01R 2201/10* (2013.01)

(58) Field of Classification Search
CPC .......... H02K 13/10; H02K 13/00; H02K 5/14; H02K 5/145; H02K 5/146; H02K 5/148;
(Continued)

(56) References Cited

U.S. PATENT DOCUMENTS 4,990,811 A * 2/1991 Nakata ................. H01R 39/381
310/239
2003/0048025 A1  3/2003 Vaucher
(Continued)

FOREIGN PATENT DOCUMENTS

CN 102035310 A1 4/2011
CN 202535190 U 11/2012
(Continued)

OTHER PUBLICATIONS

Corresponding U.S. Appl. No. 15/693,638, filed Sep. 1, 2017.
(Continued)

*Primary Examiner* — Bryan R Perez
(74) *Attorney, Agent, or Firm* — Pearne & Gordon LLP

(57) ABSTRACT

A motor includes a commutator, a bracket including a conductive brush, first and second wall parts, and first and second deformable parts. The conductive brush is in contact with the commutator. The first wall part includes a first surface extending along a first surface of the conductive brush. The second wall part includes a second surface extending along a second surface of the conductive brush located on a side opposite the first surface of the conductive brush. The first deformable part is in contact with both the first surface of the conductive brush and the first surface of the first wall part, and is deformable in response to movement of the conductive brush. The second deformable part is in contact with both the second surface of the conductive brush and the second surface of the second wall part, and is deformable in response to movement of the conductive brush.

15 Claims, 13 Drawing Sheets

(51) Int. Cl.
*H01R 39/38* (2006.01)
*H02K 5/24* (2006.01)

(58) Field of Classification Search
CPC .... H02K 11/026; H02K 23/023; H02K 23/18; H02K 23/20; H02K 27/22; H02K 2705/06; H02K 9/28; H02K 5/143; H02K 5/141; H02K 5/225; H02K 13/006; H01R 39/38; H01R 9/38; H01R 39/40; H01R 39/385; H01R 39/383; H01R 39/58; H01R 39/39
USPC ........................... 310/244–247, 238–240, 51
See application file for complete search history.

(56) References Cited

U.S. PATENT DOCUMENTS

| | | | |
|---|---|---|---|
| 2008/0012446 | A1 | 1/2008 | Akabane |
| 2015/0381016 | A1 | 12/2015 | Tsuda et al. |
| 2016/0376946 | A1* | 12/2016 | Kajiura ................ F02D 41/221 123/90.15 |
| 2017/0361681 | A1* | 12/2017 | Matsumura ........ B60H 1/00857 |
| 2017/0366054 | A1* | 12/2017 | Li ........................... H02K 1/17 |
| 2017/0366067 | A1* | 12/2017 | Hirabayashi ........... H02K 7/116 |

FOREIGN PATENT DOCUMENTS

| | | |
|---|---|---|
| JP | 49-009930 Y | 3/1974 |
| JP | S57-163179 U1 | 10/1982 |
| JP | 08-107655 A | 4/1996 |
| JP | 09-093877 A | 4/1997 |
| JP | 2003-527059 A | 9/2003 |
| JP | 2008-022619 A | 1/2008 |
| JP | 2015-220969 A | 12/2015 |

OTHER PUBLICATIONS

Notification of Reasons for Refusal dated Aug. 28, 2018 for Corresponding Application No. 2016-172048.
Japanese Office Action dated Nov. 26, 2019 for Corresponding Japanese Application No. 2018-239378 and English translation.
Japanese Office Action dated Aug. 28, 2018 for Corresponding Japanese Application No. 2016-172047 and English translation.
Chinese Office Action dated Sep. 11, 2020 for corresponding Chinese Application No. 201710780116.5 and English translation.
Chinese Office Action dated Sep. 16, 2020 for corresponding Chinese Application No. 201710780136.2 and English translation.
Office Action dated Nov. 16, 2021 in Japanese Patent Application No. 2020-191336 and English translation.
Office Action dated Nov. 10, 2021 for related U.S. Appl. No. 15/693,638.
Chinese Office Action dated Feb. 18, 2020 for Corresponding Chinese Application No. 201710780116.5 and English translation.
Chinese Office Action dated Mar. 3, 2020 for Corresponding Chinese Application No. 201710780136.2 and English translation.
Decision of Refusal dated Aug. 25, 2020 for Corresponding Japanese Application No. 2018-239378 and English translation.
Notice of Allowance dated Jun. 28, 2022 for Japanese Application No. 2020-191336 and English translation.

* cited by examiner

MOTOR

CROSS REFERENCE TO RELATED APPLICATIONS

This application claims the benefit of Japanese Patent Application No. 2016-172048, filed Sep. 2, 2016, which is hereby incorporated by reference in its entirety.

BACKGROUND

Technical Field

The present disclosure relates to a motor.

Background

For example, Japanese Patent Application Laid-Open No. 2015-220969 discloses a motor actuator (rotary apparatus) configured to drive a plurality of doors (louvers) provided in an air passage for flowing air of a vehicle air conditioning system.

The rotary apparatus outputs rotation of a rotary shaft of a motor via a plurality of gears to control pivoting of the louvers.

On the other hand, Japanese Patent Application Laid-Open No. 2008-22619 discloses a brushed motor having a brush provided with a damper member in order to reduce mechanical noise of the motor.

Recent years have seen a tendency toward increased quietness in an intra-vehicle environment. For example, a motor-driven vehicle such as an electric car emits no noise from the internal-combustion engine and thus the inside of the vehicle is remarkably quiet.

Such a high degree of quietness emphasizes noise which otherwise would not be noticeable inside a car equipped with an internal combustion engine, and thus a higher degree of low noise than ever before is considered to be required even in various parts of the car.

One source of noise of a rotary apparatus is the motor, and further improvement in quietness can be achieved by using a motor with noise reduced as compared to the motor of the related art.

SUMMARY

The present disclosure is related to providing a motor with reduced noise.

(1) According to a first aspect of the present disclosure, a motor includes a commutator, a bracket including a conductive brush, a first wall part and a second wall part, the conductive brush being in contact with the commutator, the first wall part including a first surface extending along a first surface of the conductive brush, the second wall part including a second surface extending along a second surface of the conductive brush, the second surface of the conductive brush being located on a side opposite the first surface of the conductive brush, a first deformable part in contact with both the first surface of the conductive brush and the first surface of the first wall part, the first deformable part being deformable in response to movement of the conductive brush, and a second deformable part in contact with both the second surface of the conductive brush and the second surface of the second wall part, the second deformable part being deformable in response to movement of the conductive brush.

(2) In the configuration of (1) described above, the first deformable part is in contact with a center part of the first surface of the conductive brush between a root of the conductive brush and a part of the conductive brush in contact with the commutator.

(3) In the configuration of (1) or (2) described above, the second deformable part is in contact with a center part of the second surface of the conductive brush between a root of the conductive brush and a part of the conductive brush in contact with the commutator.

(4) In the configuration of any one of (1) to (3) described above, the first deformable part is always in contact with both the first surface of the conductive brush and the first surface of the first wall part, and the second deformable part is always in contact with both the second surface of the conductive brush and the second surface of the second wall part.

(5) In the configuration of (2) described above, when a length between the root of the conductive brush and the part of the conductive brush in contact with the commutator is represented as L, the first deformable part is in contact with a range of greater than or equal to L/4 of the first surface of the conductive brush including a position at a center between the root of the conductive brush and the part of the conductive brush in contact with the commutator.

(6) In the configuration of (2) or (3) described above, when a length between the root of the conductive brush and the part of the conductive brush in contact with the commutator is represented as L, the second deformable part is in contact with a range of greater than or equal to L/4 of the second surface of the conductive brush including a position at a center between the root of the conductive brush and the part of the conductive brush in contact with the commutator.

(7) In the configuration of at least one of (1) to (6) described above, the first deformable part and the second deformable part include a gel having a hardness of greater than or equal to 30 and less than or equal to 70 in a type 00 hardness compliant with ASTM D 2240.

(8) In the configuration of any one of (1) to (6) described above, the first deformable part and the second deformable part include grease having consistency of greater than or equal to 60 and less than or equal to 165 in grade 5 or a higher grade.

(9) In the configuration of any one of (1) to (8) described above, one of the first deformable part and the second deformable part includes a first resin part formed with a plurality of different types of resins.

(10) In the configuration of (9) described above, one of the first deformable part and the second deformable part not including the first resin part includes a second resin part formed with a single type of resin.

(11) In the configuration of (9) or (10) described above, the plurality of different types of resins are one of rubbers having a rubber hardness compliant with JIS K6253 (shore A hardness) of greater than or equal to 25 and less than or equal to 60.

(12) In the configuration of (9) or (10) described above, the single type of resin is one of rubbers having a rubber hardness compliant with JIS K6253 (shore A hardness) of greater than or equal to 25 and less than or equal to 60.

(13) In the configuration of (2) described above, a part of the first surface of the first wall part corresponding to the center part of the first surface of the conductive brush is located at a position closer to the first surface of the conductive brush than another part.

(14) In the configuration of (3) described above, a part of the second surface of the second wall part corresponding to the center part of the second surface of the conductive brush is located at a position closer to the second surface of the conductive brush than another part.

(15) In the configuration of any one of (1) to (14) described above, the motor includes a pair of the conductive brushes in contact with the commutator, a pair of the first wall parts provided to correspond to the respective conductive brushes, a pair of the first deformable parts provided to correspond to the respective conductive brushes, a pair of the second wall parts provided to correspond to the respective conductive brushes, and a pair of the second deformable parts provided to correspond to the respective conductive brushes.

(16) In the configuration of any one of (1) to (15) described above, the first surface of the first wall part is a surface parallel to the first surface of the conductive brush.

(17) In the configuration of any one of (1) to (16) described above, the second surface of the second wall part is a surface parallel to the second surface of the conductive brush.

According to the present disclosure, a motor with reduced noise is provided.

BRIEF DESCRIPTION OF THE DRAWINGS

FIGS. 6A and 6B are diagrams for explaining a state of a second deformable part while the motor according to the first embodiment is being driven, wherein FIG. 6A is a plan view of the bracket viewed from a frame side and FIG. 6B is an enlarged view of a dotted line region A1 of FIG. 6A;

FIGS. 7A and 7B are diagrams for explaining a state of a first deformable part while the motor according to the first embodiment is being driven, wherein FIG. 7A is a plan view of the bracket viewed from the frame side and FIG. 7B is an enlarged view of a dotted line region A2 of FIG. 7A;

DETAILED DESCRIPTION

Modes for carrying out the present disclosure (hereinafter referred to as "embodiments") are described in detail below with reference to the accompanying drawings.

Note that the same components are denoted by the same numbers throughout the explanation of the embodiments.

First Embodiment

Figure 1:
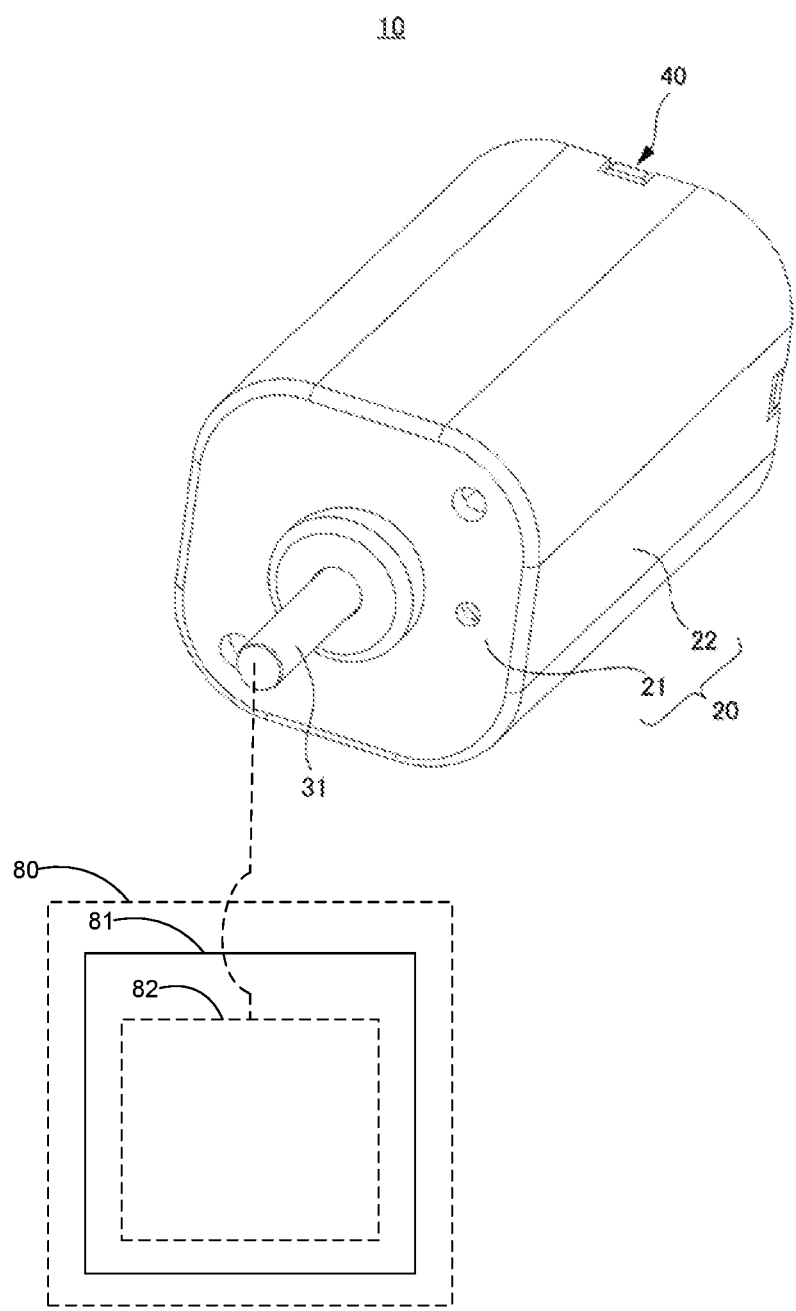
FIG. 1 is a perspective view of a motor according to a first embodiment of the present disclosure.
Figure 2:
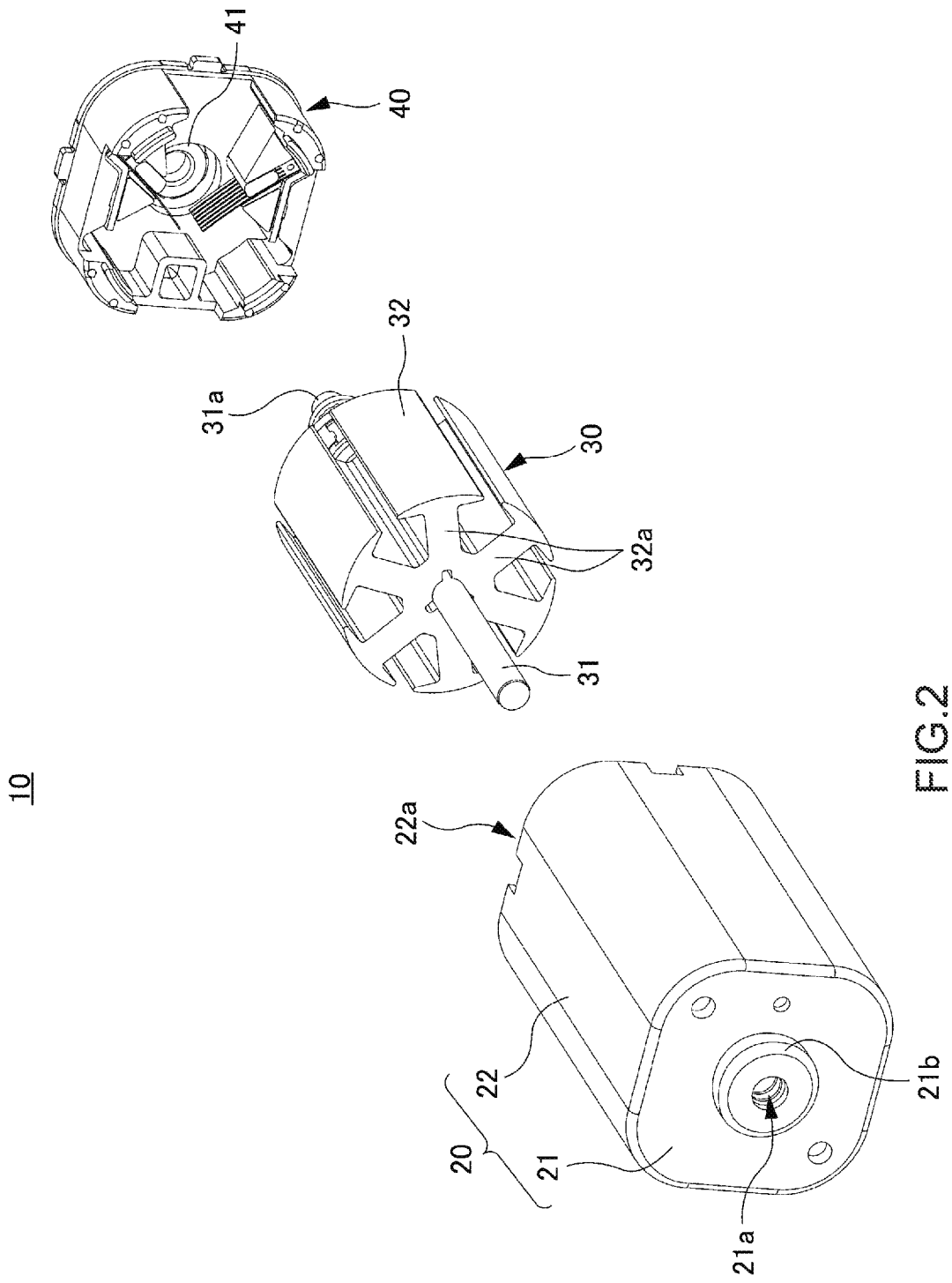
FIG. 2 is an exploded perspective view of the motor according to the first embodiment.

FIG. 1 is a perspective view of a motor 10 according to a first embodiment of the present disclosure. FIG. 2 is an exploded perspective view of the motor 10 according to the first embodiment.

The motor 10 according to the present embodiment can be suitably used as, for example, a driving source of a rotary apparatus configured to drive louvers 82 and the like of an air conditioning system 81 provided in a vehicle 80.

However, a mode of use of the motor 10 is not limited to a rotary apparatus.

As shown in FIG. 2, the motor 10 includes a frame 20, a plurality of magnets (not shown) provided in the frame 20, an armature 30, and a bracket 40.

(Frame)

As shown in FIG. 2, the frame 20 includes a bottom part 21 and a side wall part 22. The bottom part 21 is provided with a hole part 21a for passing a rotary shaft 31 of the armature 30 through to the outside. The side wall part 22 is connected to the bottom part 21 and includes an opening part 22a on a side opposite to the bottom part 21. The side wall part 22 covers an outer periphery of the armature 30.

Note that the bracket 40 is attached to the opening part 22a of the frame 20 to close the opening part 22a of the frame 20.

In the present embodiment, the side wall part 22 of the frame 20 has an outer shape of a square column curved at corners, but the outer shape may be changed as necessary.

The plurality of magnets are disposed at an inner wall surface of the side wall part 22 of the frame 20 opposing the armature 30. The plurality of magnets are spaced apart from the armature 30.

The bottom part 21 of the frame 20 is provided with a bearing part 21b projecting outward from the frame 20 in the rotary shaft 31 direction.

The hole part 21a for passing the rotary shaft 31 through is provided at the center of the bearing part 21b.

A bearing rotatably supporting the rotary shaft 31 is housed inside the bearing part 21b.

(Armature)

As shown in FIG. 2, the armature 30 includes a core 32, a coil (not shown) wound around the core 32, and the rotary shaft 31 fixed to the core 32.

The rotary shaft 31 is disposed at the center of the core 32 to penetrate through the core 32.

Note that the core 32 includes a plurality of metal sheets stacked and integrated in the rotary shaft 31 direction.

The plurality of metal sheets may be, for example, electromagnetic steel sheets.

Figure 3:
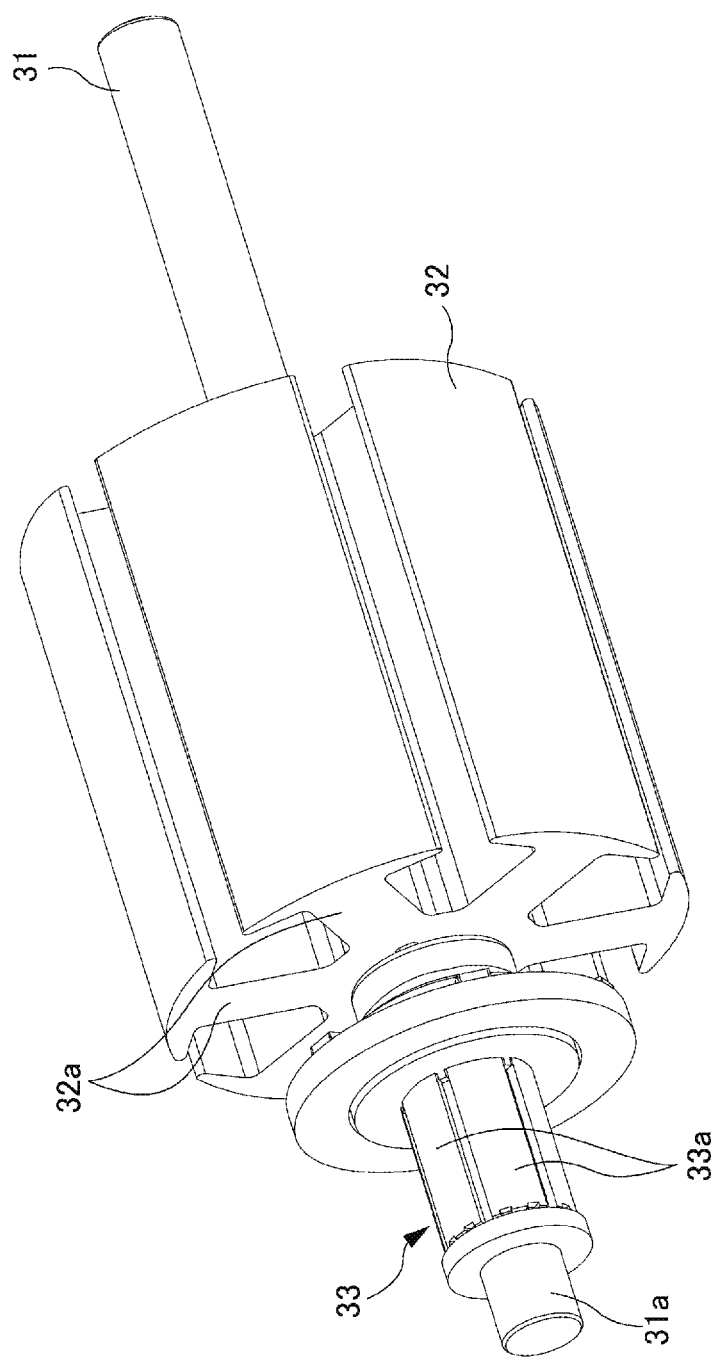
FIG. 3 is a perspective view of an armature according to the first embodiment.

FIG. 3 is a perspective view of the armature 30.

As shown in FIG. 3, the armature 30 includes a commutator 33 provided along an outer circumferential surface of the rotary shaft 31 in a circumferential direction.

The commutator 33 includes a plurality of sheet metals 33a. The rotary shaft 31 has one end part led out to the outside of the motor 10 and the other end part located at an end opposite to the one end part, and the plurality of sheet metals 33a are provided at the other end part side of the rotary shaft 31.

End parts of coils (not shown) wound around respective poles 32a of the core 32 are connected to the sheet metals 33a of the commutator 33 by solder or the like.

Note that another end part 31a of the rotary shaft 31 located further to the other side than the position of the commutator 33 is rotatably supported by a bearing 41 provided in the bracket 40.

(Bracket)

Figure 4:
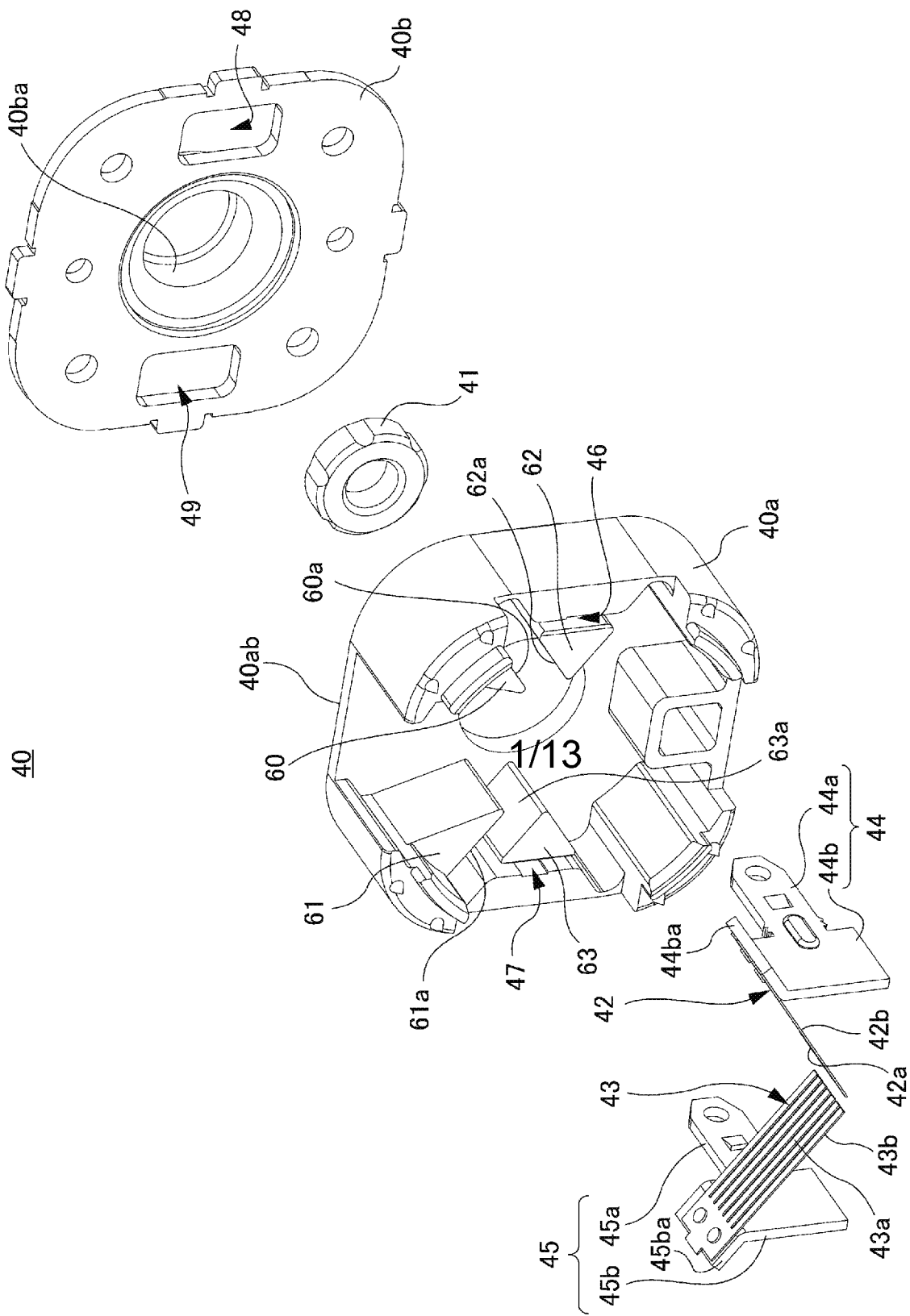
FIG. 4 is an exploded perspective view of a bracket according to the first embodiment.

FIG. 4 is an exploded perspective view of the bracket 40.

As shown in FIG. 4, the bracket 40 includes a bracket main body 40a and a bearing plate 40b.

The bracket main body 40a includes a bottom part 40ab. The bottom part 40ab is located on a side opposite to the frame 20 side.

The bearing plate 40b is attached to the outer side of the bottom part 40ab of the bracket main body 40a.

A bearing part 40ba is provided at the center of the bearing plate 40b. The bearing part 40ba projects to a side opposite to the bracket main body 40a.

The bearing 41 is housed in the bearing part 40ba, and the bearing plate 40b is attached to and integrated with the bracket main body 40a. In this manner, the bracket 40 includes the bearing 41.

The bracket 40 includes a pair of conductive brushes (a conductive brush 42 and a conductive brush 43) and a pair of terminal parts (a terminal part 44 and a terminal part 45). The pair of conductive brushes (the conductive brush 42 and the conductive brush 43) are respectively attached to the pair of terminal parts (a terminal part 44 and a terminal part 45).

The terminal part 44 and the terminal part 45 have substantially the same configuration except that shapes of the terminal part 44 and the terminal part 45 are symmetrical with each other. A bending direction of one end part 44ba side of a first end part 44b described below is opposite to a bending direction of one end part 45ba side of a first end part 45b described below.

Specifically, the terminal part 44 includes a terminal 44a and a first end part 44b. The terminal 44a is led out to the outside. The first end part 44b is connected to the terminal 44a. A part of the first end part 44b on the one end part 44ba side is bent.

The terminal 44a is a part serving as an external electrical connection.

The terminal part 45 also includes a terminal 45a led out to the outside and a first end part 45b connected to the terminal 45a. A part of the first end part 45b on the one end part 45ba side is bent.

The terminal 45a is a part serving as an external electrical connection.

Figure 5:
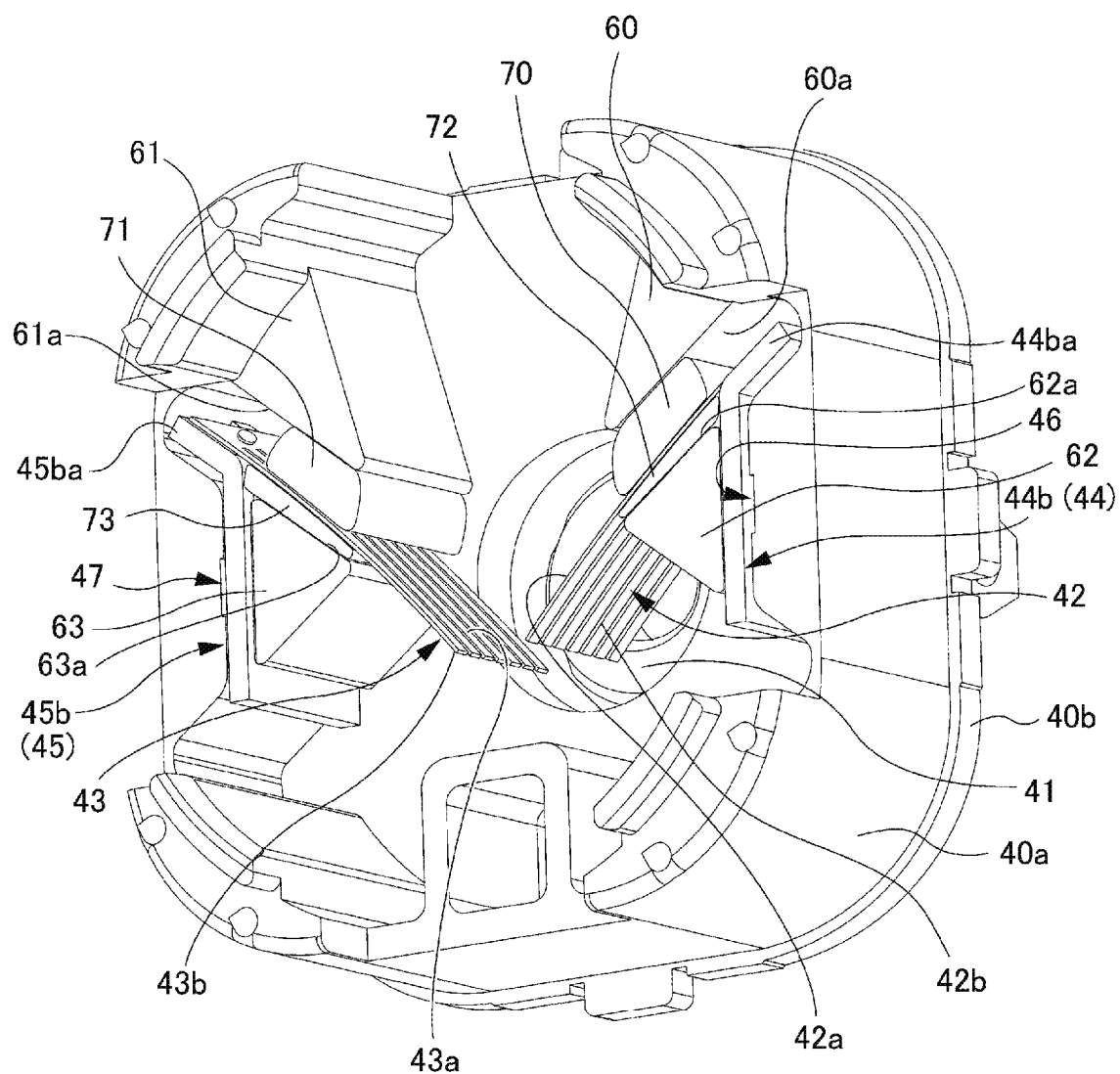
FIG. 5 is a perspective view of the bracket according to the first embodiment.

FIG. 5 is a perspective view of the bracket 40.

As shown in FIG. 4, the bracket main body 40a is provided with a groove part 46. The terminal 44a of the terminal part 44 is inserted into the groove part 46. The bottom part of the groove part 46 includes a hole part for passing the terminal 44a through.

The bottom part of the groove part 46 opposes the bearing plate 40b.

The bearing plate 40b is provided with an opening part 48 corresponding to the terminal 44a of the terminal part 44.

The opening part 48 is disposed at a position opposing the terminal 44a.

Accordingly, as shown in FIG. 5, when the terminal 44a of the terminal part 44 is inserted into the groove part 46 of the bracket main body 40a with the conductive brush 42 being fixed to the terminal part 44, the terminal 44a can be passed through the hole part in the bottom part of the groove part 46 to the outside.

Similarly, as shown in FIG. 4, a groove part 47 is provided in the bracket main body 40a. The terminal 45a of the terminal part 45 is inserted into the groove part 47. The bottom part of the groove part 47A is provided with a hole part for passing the terminal 45a through.

The bearing plate 40b is provided with an opening part 49 corresponding to the terminal 45a of the terminal part 45.

The opening part 49 is disposed at a position opposite the terminal 45a.

Accordingly, as shown in FIG. 5, when the terminal 45a of the terminal part 45 is inserted into the groove part 47 of the bracket main body 40a with the conductive brush 43 being fixed to the terminal part 45, the terminal 45a can be passed through the hole part in the bottom part of the groove part 47 to the outside.

Note that the commutator 33 of the armature 30 is located at a position near the bearing 41 shown in FIG. 5.

Therefore, as it is seen from FIGS. 4 and 5, in a radial direction, an end part of the conductive brush 42 at a side opposite to the commutator 33 side is fixed to one end side of the first end part 44b of the terminal part 44.

More specifically, the end part of the conductive brush 42 is fixed to the one end part 44ba of the first end part 44b. The one end part 44ba is a part at the one end side of the first end part 44b.

Similarly, as to the conductive brush 43, an end part of the conductive brush 43 at a side opposite to the commutator 33 side is fixed to the one end part 45ba of the first end part 45b of the terminal part 45. The one end part 45ba is a part at the one end side of the first end part 45b.

The operation of the motor 10 having the configuration described above will be described below, and a more detailed configuration of the motor 10 will also be described below.

When electric power is supplied through the terminal part 44 and the terminal part 45, an electric current is supplied to the coils via the sheet metals 33a of the commutator 33 in contact with the conductive brush 42 and the conductive brush 43.

Then, the poles 32a (see FIG. 3) are magnetized to an N pole or an S pole depending on a winding direction of the excited coils. Attraction occurs between the poles 32a and a magnetic force of the magnets provided in the frame 20, and the armature 30 rotates.

The commutator 33 also rotates along with the rotation of the armature 30. The conductive brush 42 and the conductive brush 43 come into contact with other sheet metals 33a different from the sheet metals 33a of the above commutator 33 which were previously in contact with the conductive brush 42 and the conductive brush 43.

Consequently, an electric current is supplied to the coils connected to the sheet metals 33a of the commutator 33 which have newly come in contact with the conductive brush 42 and the conductive brush 43. The coils supplied with the electric current are excited, and the poles 32a corresponding to the excited coils are magnetized to the N pole or the S pole depending on the winding direction of the coils.

Then, attraction occurs again between the poles 32a and the magnetic force of the magnets provided in the frame 20, and the armature 30 rotates.

By repeating the above, the rotary shaft 31 of the motor 10 continues to rotate.

When the conductive brush 42 and the conductive brush 43 come into contact with the different sheet metals 33a from the sheet metals 33a of the commutator 33 which were previously in contact with the conductive brush 42 and the conductive brush 43, vibration occurs in the conductive brush 42 and the conductive brush 43, and the vibration causes noise.

The inventors have carried out detailed studies of the state of vibration of the conductive brush 42 and the conductive brush 43 and found that, in the conductive brush 42, acceleration due to vibration was the greatest at a position substantially at the center of a portion in a free state between the terminal section 44 and at a position where the conductive brush 42 was in contact with the commutator 33.

Similarly, the inventor found that, in the conductive brush 43, acceleration due to vibration was the greatest at a position substantially at the center of a part in a free state between the terminal part 45 and a position where the conductive brush 43 was in contact with the commutator 33.

Based on such knowledge, in the present embodiment, a first deformable part 72 and a second deformable part 70 are provided to suppress vibration of the conductive brush 42 and a first deformable part 73 and a second deformable part 71 are provided to suppress vibration of the conductive brush 43. Components related to the deformable parts will be described in detail below.

(Second Deformable Part 70)

As shown in FIGS. 4 and 5, the bracket 40 includes a second wall part 60.

The second wall part 60 is provided at the bracket main body 40a.

The second wall part 60 has a second surface 60a extending along a second surface 42a of the conductive brush 42 and toward the commutator 33 side (the center side of the bracket 40). The second surface 42a of the conductive brush 42 is a surface in contact with the commutator 33.

Note that, in the present embodiment, the second surface 60a of the second wall part 60 is provided as a surface parallel to the second surface 42a of the conductive brush 42 in a state where the conductive brush 42 is not in contact with the commutator 33.

However, the second surface 60a of the second wall part 60 is not limited to a surface parallel to the second surface 42a of the conductive brush 42.

That is, the second surface 60a of the second wall part 60 may extend along the second surface 42a of the conductive brush 42 in contact with the commutator 33 and toward the commutator 33 side (the center side of the bracket 40) such that the second surface 60a of the second wall part 60 is inclined with respect to the second surface 42a of the conductive brush 42.

As shown in FIG. 5, the motor 10 includes, between the second surface 42a of the conductive brush 42 and the second surface 60a of the second wall part 60, the second deformable part 70 provided to be always in contact with (always adhere to) both of the surfaces (the second surface 42a and the second surface 60a).

Note that "always in contact (always adhere)" as used herein does not mean that a contact (adhering) state is kept until the motor 10 becomes unusable.

That is, as the motor 10 continues to be used for a long period, peeling may occur between the second deformable part 70 and the second surface 42a and peeling may occur between the second deformable part 70 and the second surface 60a.

Therefore, it is to be noted that "always in contact (always adhere)" should be understood to mean that the second deformable part 70 is always in contact with (always adheres to) both of the surfaces as long as an unusual situation such as peeling does not occur, and should not be understood to mean that the second deformable part 70 permanently continues to be in contact with (adhere to) both of the surfaces.

In the present embodiment, the second deformable part 70 is formed with a gel. From the viewpoint of suppressing vibration, a gel having a hardness of greater than or equal to 30 and less than or equal to 70 in a type 00 hardness compliant with ASTM D 2240 can be suitably used.

Note that a type of the gel may be a two-part hardening type, an ultraviolet curing type, a thermosetting type, and the like and is not particularly limited.

The second deformable part 70 may be formed of grease instead of a gel. In this case, from the viewpoint of suppressing vibration, it is suitable to use grease having consistency of greater than or equal to 60 and less than or equal to 165 in grade 5 or a higher grade.

The second deformable part 70 will be described in detail with reference to FIGS. 6A and 6B.

Figure 6A:
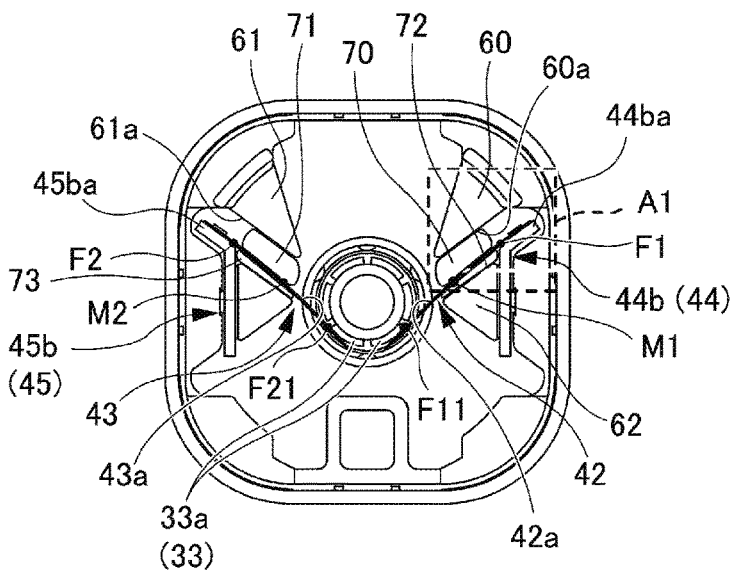
Figure 6B:
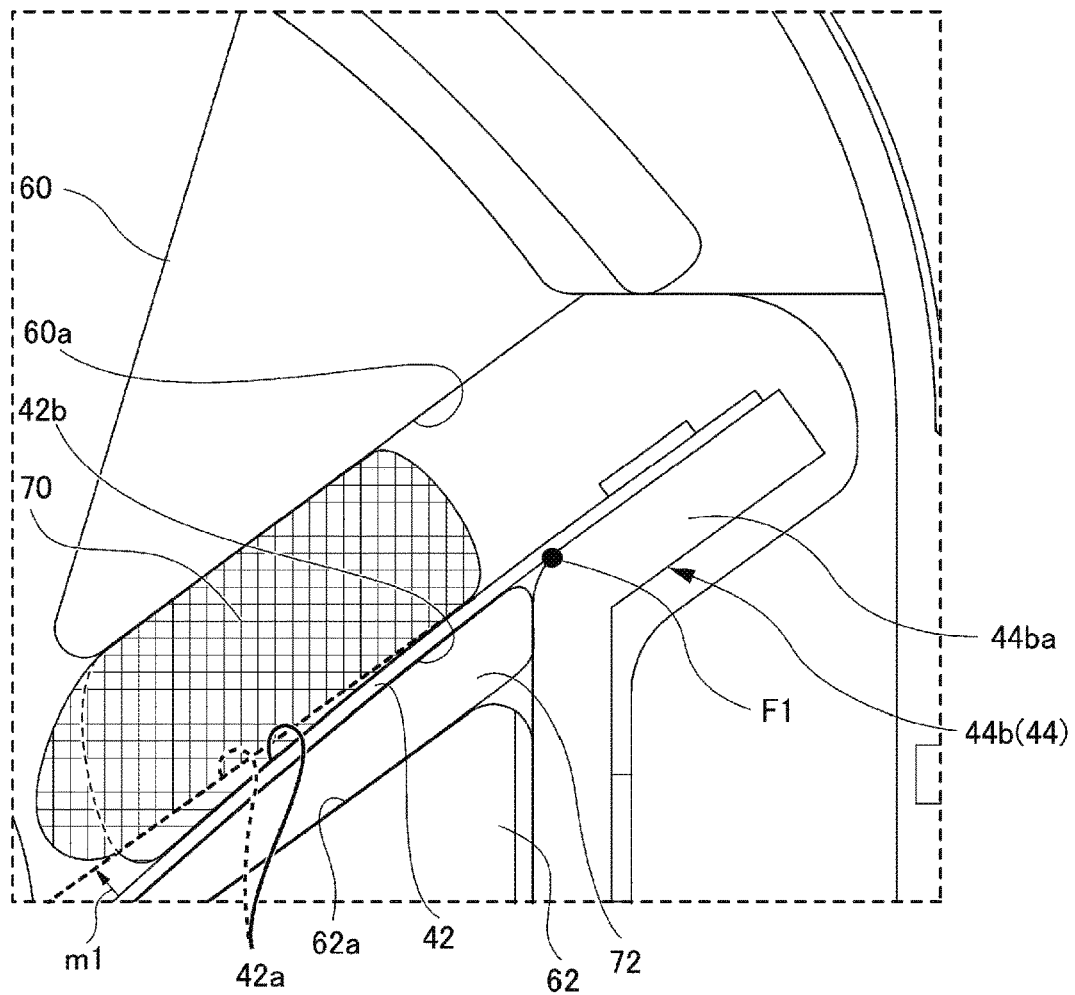

FIGS. 6A and 6B are diagrams for explaining a state of the second deformable part 70 while the motor 10 is being driven. FIG. 6A is a plan view of the bracket 40 viewed from the frame 20 side. FIG. 6B is an enlarged view of a dotted line region A1 of FIG. 6A.

Note that, in FIG. 6A, the sheet metals 33a of the commutator 33 provided in the armature 30 are also shown.

As shown in FIG. 6A, the conductive brush 42 is in a free state. In the free state, the conductive brush 42 is not supported between a root (see position F1) not supported by the terminal part 44 and a part (see position F11) of the conductive brush 42 in contact with the commutator 33.

The second deformable part 70 is provided at a center part at least including the center (see position M1) of the conductive brush 42 between the root of the conductive brush 42 and the part of the conductive brush 42 in contact with the commutator 33 (between position F1 and position F11).

Here, the length between the root of the conductive brush 42 and the part of the conductive brush 42 in contact with the commutator 33 (between position F1 and position F11) is represented as L. Then, the second deformable part 70 is in contact with at least a range of greater than or equal to L/4 of the second surface 42a of the conductive brush 42 including the position of the center (the position M1) between the root of the conductive brush 42 and the part of the conductive brush 42 in contact with the commutator 33. The second deformable part 70 is more desirably in contact with at least a range of greater than or equal to L/3 of the second surface 42a.

Note that it goes without saying that, a range in which the second deformable part 70 may be brought close to a contact position of the conductive brush 42 and the commutator 33, that is, a range in which the second deformable part 70 is provided toward the commutator 33 side is a range in which the second deformable part 70 does not prevent the conductive brush 42 from coming into contact with the commutator 33.

In this manner, it is possible to effectively suppress vibration by at least providing the second deformable part 70 in the range including the position M1 where acceleration due to vibration is the greatest. Hereinafter, a state where the second deformable part 70 suppresses vibration will be specifically described.

When the motor 10 is driven and the conductive brush 42 vibrates, for example, as shown in FIG. 6B, the second surface 42a of the conductive brush 42 is displaced from a position indicated by a solid line to a position indicated by a dotted line as indicated by an arrow m1.

At this point, the second deformable part 70 is deformed in response to movement of the conductive brush 42.

Specifically, as shown in FIG. 6B, the shape of the second deformable part 70 changes from a state indicated by a hatched area to a state indicated by a cross-hatched area.

The change in shape is a phenomenon caused by the second deformable part 70 being in contact with and sandwiched by both the second surface 42a of the conductive brush 42 and the second surface 60a of the second wall part 60.

That is, even if the second deformable part 70 is in contact with the second surface 42a of the conductive brush 42, if the second surface 60a side of the second wall part 60 is free, a compression force is not applied to the second deformable part 70. Therefore, the change in shape of the second deformable part 70 is extremely small.

As the second deformable part 70 is compressed and the shape of the second deformable part 70 changes, a reaction force acts on the conductive brush 42 to stop the movement of the conductive brush 42. The reaction force tends to stop the movement of the conductive brush 42. Therefore, the movement of the conductive brush 42 is suppressed.

On the other hand, when the conductive brush 42 moves oppositely, that is, when the second surface 42a of the conductive brush 42 tends to move in a direction opposite to the direction of the arrow m1 from the position of the dotted line to the position indicated by the solid line shown in FIG. 6B, the shape of the second deformable part 70 changes.

Specifically, the shape of the second deformable part 70 deforms in a direction in which the second surface 60a of the second wall part 60 extends or a direction in which the second surface 42a of the conductive brush 42 extends, and toward the root F1 of the conductive brush 42.

That is, a part of the second deformable part 70 returns to a space formed between the second surface 42a of the conductive brush 42 and the second surface 60a of the second wall part 60 where the second deformable part 70 is present.

Since the second deformable part 70 is not an elastic body such as a spring, the second deformable part 70 does not immediately return to an original shape with an elastic force of the second deformable part 70. The change in shape of the second deformable part 70 at the time when the conductive brush 42 tends to move to the position indicated by the solid line is mainly caused by a force generated by a bend of the conductive brush 42 (a restoring force).

The second deformable part 70 is pulled by the movement of the conductive brush 42 in the direction opposite to the arrow m1.

Due to the pulling, the shape of the second deformable part 70 changes. The change in shape of the second deformable part 70 causes a reaction force acting on the conductive brush 42. The reaction force tends to stop the movement of the conductive brush 42 in a direction away from the second surface 60a side of the second wall part 60.

Along with the change in shape of the second deformable part 70, action for absorbing (reducing) a moving force of the conductive brush 42 is simultaneously generated.

Note that the reaction force, in other words, stopping action, is also a phenomenon caused by the second deformable part 70 in contact with both the second surface 42a of the conductive brush 42 and the second surface 60a of the second wall part 60. If the second deformable part 70 is not in contact with the second surface 60a of the second wall part 60, the second deformable part 70 moves together with the conductive brush 42 in the same manner.

In this manner, the second deformable part 70 acts to suppress the movement of the conductive brush 42 when the conductive brush 42 tends to move from the position of the solid line to the position of the dotted line shown in FIG. 6B and also when the conductive brush 42 tends to move in a reverse manner from the position of the dotted line to the position of the solid line.

"The conductive brush 42 vibrates" means that the conductive brush 42 repeatedly moves between the position of the solid line and the position of the dotted line shown in FIG. 6B. As described above, the second deformable part 70 acts to suppress the movement both when the conductive brush 42 moves toward the position of the solid line and toward the position of the dotted line, and suppresses the vibration of the conductive brush 42.

Here, a volume of the second deformable part 70 before the change in shape of the second deformable part 70 is represented as T, a volume of a part of the second deformable part 70 changed in shape by compression or pulling is represented as $\Delta t$, and a shape change ratio VC is represented as $\Delta T/T$. The greater the shape change ratio VC, the greater the extent to which the vibration due to the change in shape can be suppressed.

Therefore, in order to increase the shape change ratio VC, it is desirable to reduce the volume of the second deformable part 70 determined at a state before driving the motor 10.

As is seen from FIG. 6B, the second deformable part 70 is provided to be in contact with both the second surface 42a of the conductive brush 42 and the second surface 60a of the second wall part 60. Therefore, the volume of the second deformable part 70 is adjusted by the distance between the second surface 42a of the conductive brush 42 and the second surface 60a of the second wall part 60.

Specifically, the length and the like of the conductive brush 42 employed varies depending on the size of the motor 10. Accordingly, the distance between the second surface 42a of the conductive brush 42 and the second surface 60a of the second wall part 60 to provide the second deformable part 70 with an appropriate volume is preferably determined based on the length of the conductive brush 42.

Here, the length from the root (see the position F1 shown in FIGS. 6A and 6B) of the conductive brush 42 on the terminal part 44 side to the position F11 (see FIG. 6A) where the conductive brush 42 is in contact with the commutator 33 is 1.0. Then, at least in a range where the second deformable part 70 is provided, a distance (hereinafter also referred to as first distance) between the second surface 42a of the conductive brush 42 and the second surface 60a of the second wall part 60 is preferably set to be less than or equal to 0.5 and more preferably set to less than or equal to 0.3.

The second wall part 60 is provided in the bracket main body 40a such that the first distance between the second surface 42a of the conductive brush 42 and the second surface 60a of the second wall part 60 is a predetermined distance.

The first distance is obtained as follows. With the conductive brush 42 not in contact with the commutator 33 and the conductive brush 42 extending substantially straight, perpendiculars are drawn from points on the second surface 60a of the second wall part 60 to the conductive brush 42. Then, distances between the second surface 42a of the conductive brush 42 and the second surface 60a of the second wall part 60 are calculated. The first distance is the longest distance among the calculated distances.

On the other hand, if the first distance is too short, the second deformable part 70 sometimes cannot be sufficiently deformed. Therefore, the first distance is desirably set to greater than or equal to 0.1 and more desirably set to greater than or equal to 0.2.

Note that, in the present embodiment, the second deformable part 70 is provided further on the commutator 33 side than the root (see position F1) of the conductive brush 42. However, the second deformable part 70 may be provided further to the one end part 44*ba* side of the first end part 44*b* of the terminal part 44 than the root (see position F1) of the conductive brush 42.

Further, for example, taking into account a space where the second deformable part 70 is provided, the second deformable part 70 may be provided within a range of L/3 or within a range of L/4 including position M1.

(Second Deformable Part 71)

As shown in FIGS. 4 and 5, the bracket 40 includes a second wall part 61 provided at the bracket main body 40*a*. The second wall part 61 includes a second surface 61*a* extending along the second surface 43*a* of the conductive brush 43 and toward the commutator 33 side (the center side of the bracket 40). The second surface 43*a* of the conductive brush 43 is a surface in contact with the commutator 33.

Note that the second surface 61*a* of the second wall part 61 is provided as a surface parallel to the second surface 43*a* of the conductive brush 43 in a state where the conductive brush 43 is not in contact with the commutator 33.

However, the second surface 61*a* of the second wall part 61 is not limited to a surface parallel to the second surface 43*a* of the conductive brush 43.

That is, the second surface 61*a* of the second wall part 61 may extend along the second surface 43*a* of the conductive brush 43 in contact with the commutator 33 and toward the commutator 33 side (the center side of the bracket 40) such that the second surface 61*a* of the second wall part 61 is inclined with respect to the second surface 43*a* of the conductive brush 43.

As shown in FIG. 5, the motor 10 includes, between the second surface 43*a* of the conductive brush 43 and the second surface 61*a* of the second wall part 61, the second deformable part 71 provided to be always in contact with (always adhere to) both of the surfaces (the second surface 43*a* and the second surface 61*a*).

Note that, as described above for the second deformable part 70, "always in contact (always adhere)" as used herein does not mean that a contact (adhering) state is kept until the motor 10 becomes unusable. "Always in contact (always adhere)" means that the second deformable part 71 is always in contact with (always adhere to) both of the surfaces as long as an unusual situation does not occur during continuous use of the motor 10. Such an unusual situation may be occurrence of peeling between the second deformable part 71 and the second surface 43*a* or occurrence of peeling between the second deformable part 71 and the second surface 61*a*. "Always in contact (always adhere)" should not be understood to mean that the second deformable part 71 permanently continues to be in contact with (adhere to) both of the surfaces.

Like the second deformable part 70, the second deformable part 71 is formed of a gel. From the viewpoint of suppressing vibration, a gel having a hardness of greater than or equal to 30 and less than or equal to 70 in a type 00 hardness compliant with ASTM D 2240 is preferably used.

Note that, in the second deformable part 71, as in the second deformable part 70, a type of the gel may be a two-part hardening type, an ultraviolet curing type, a thermosetting type, and the like and is not particularly limited.

Like the second deformable part 70, the second deformable part 71 may be formed of grease instead of a gel. In this case, from the viewpoint of suppressing vibration, it is suitable to use grease having consistency of greater than or equal to 60 and less than or equal to 165 in grade 5 or a higher grade.

The second deformable part 71 is a part for achieving, on the conductive brush 43, the same action as the action of the second deformable part 70 on the conductive brush 42. Therefore, the state of the second deformable part 71 at the time when the motor 10 is driven is the same as the state described concerning the second deformable part 70.

Therefore, although a detailed explanation is omitted, the second deformable part 71 is also provided as shown in FIG. 6A. The second deformable part 71 is also provided at least at a center part including the center (see position M2) of the conductive brush 43 between a root of the conductive brush 43 and a part of the conductive brush 43 in contact with the commutator 33 (between position F2 and position F21).

Here, the length between the root of the conductive brush 43 and the portion of the conductive brush 43 in contact with the commutator 33 (between position F2 and position F21) is represented as L. Then, the second deformable part 71 is in contact with at least a range of greater than or equal to L/4 of the second surface 43*a* of the conductive brush 43 including the position of the center (position M2) between the root of the conductive brush 43 and the part of the conductive brush 43 in contact with the commutator 33. The second deformable part 71 is more desirably in contact with at least a range of greater than or equal to L/3 of the second surface 43*a*.

Note that it goes without saying that, a range in which the second deformable part 71 is provided toward the commutator 33 side is a range in which the second deformable part 71 does not prevent the conductive brush 43 from coming into contact with the commutator 33.

In this manner, it is possible to effectively suppress vibration of the conductive brush 43 by at least providing, like the second deformable part 70, the second deformable part 71 in the range including position M2 where acceleration due to vibration is the greatest.

The distance between the second surface 43*a* of the conductive brush 43 and the second surface 61*a* of the second wall part 61 is preferably determined as in the second deformable part 70.

Here, the length from the root (see position F2 shown in FIG. 6A where the conductive brush 43 is not supported by the terminal part 45) of the conductive brush 43 on the terminal part 45 side to position F21 (see FIG. 6A) where the conductive brush 43 is in contact with the commutator 33 is 1.0. Then, at least in a range where the second deformable part 71 is provided, a distance (hereinafter also referred to as first distance) between the second surface 43*a* of the conductive brush 43 and the second surface 61*a* of the second wall part 61 is preferably set to be less than or equal to 0.5 and more preferably set to less than or equal to 0.3.

The second wall part 61 is provided in the bracket main body 40*a* such that the first distance between the second surface 43*a* of the conductive brush 43 and the second surface 61*a* of the second wall part 61 is a predetermined distance.

This first distance is obtained as follows, which is similar to how the first distance is obtained as described above for the second deformable part 70. With the conductive brush 43 not in contact with the commutator 33 and the conductive brush 43 extending substantially straight, perpendiculars are drawn from points on the second surface 61*a* of the second wall part 61 to the conductive brush. Then, distances between the second surface 43*a* of the conductive brush 43 and the second surface 61*a* of the second wall part 61 are calculated. The first distance is the longest distance among the calculated distances.

On the other hand, if the first distance is short, the second deformable part 71 sometimes cannot be sufficiently deformed. Therefore, the first distance is desirably set to greater than or equal to 0.1 and more desirably set to greater than or equal to 0.2.

Note that, in the present embodiment, the second deformable part 71 is provided further on the commutator 33 side than the root (see position F2) of the conductive brush 43. However, the second deformable part 71 may be provided further to the one end part 45ba side of the first end part 45b of the terminal part 45 than the root (see position F2) of the conductive brush 43.

Further, taking into account, for example, a relation of a space where the second deformable part 71 is provided, the second deformable part 71 may be provided within a range of L/3 or a range of L/4 including position M2.

(First Deformable Part 72)

As shown in FIG. 5, the bracket 40 includes a first wall part 62 provided at the bracket main body 40a. The first wall part 62 has a first surface 62a extending along a first surface 42b located at a side opposite the second surface 42a of the conductive brush 42 and toward the commutator 33 side (the center side of the bracket 40).

Note that the first surface 62a of the first wall part 62 is formed to be a surface parallel to the first surface 42b of the conductive brush 42 in a state in which the conductive brush 42 is not in contact with the commutator 33.

However, the first surface 62a of the first wall part 62 is not limited to a surface parallel to the first surface 42b of the conductive brush 42.

That is, the first surface 62a of the first wall part 62 may extend along the first surface 42b located at a side opposite the second surface 42a of the conductive brush 42 and toward the commutator 33 side (the center side of the bracket 40) such that the first surface 62a of the first wall part 62 is inclined with respect to the first surface 42b of the conductive brush 42.

As shown in FIG. 5, the motor 10 includes, between the first surface 42b of the conductive brush 42 and the first surface 62a of the first wall part 62, the first deformable part 72 provided to be always in contact with (always adhere to) both of the surfaces (the first surface 42b and the first surface 62a).

Note that, as has been described for the second deformable part 70, "always in contact (always adhere)" herein does not mean that a contact (adhering) state is kept until the motor 10 becomes unusable. "Always in contact (always adhere)" means that the first deformable part 72 is always in contact with (always adhered to) both of the surfaces as long as an unusual situation does not occur during continuous use of the motor 10. Such an unusual situation may be occurrence of peeling between the first deformable part 72 and the first surface 42b or occurrence of peeling between the first deformable part 72 and the first surface 62a. It should not be understood to mean that the first deformable part 72 permanently continues to be in contact with (adhere to) both of the surfaces.

In the present embodiment, the first deformable part 72 is formed of a gel. From the viewpoint of suppressing vibration, a gel having a hardness of greater than or equal to 30 and less than or equal to 70 in a type 00 hardness compliant with ASTM D 2240 can be suitably used.

Note that a type of the gel may be a two-part hardening type, an ultraviolet curing type, a thermosetting type, and the like and is not particularly limited.

The first deformable part 72 may be formed of grease instead of a gel. In this case, from the viewpoint of suppressing vibration, it is suitable to use grease having consistency of greater than or equal to 60 and less than or equal to 165 in grade 5 or a higher grade.

The first deformable part 72 will be described in detail with reference to FIGS. 7A and 7B.

Figure 7A:
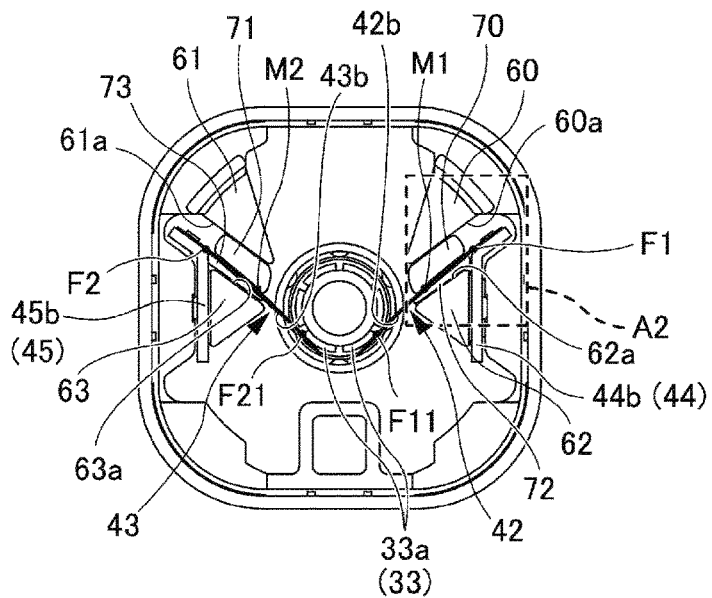
Figure 7B:
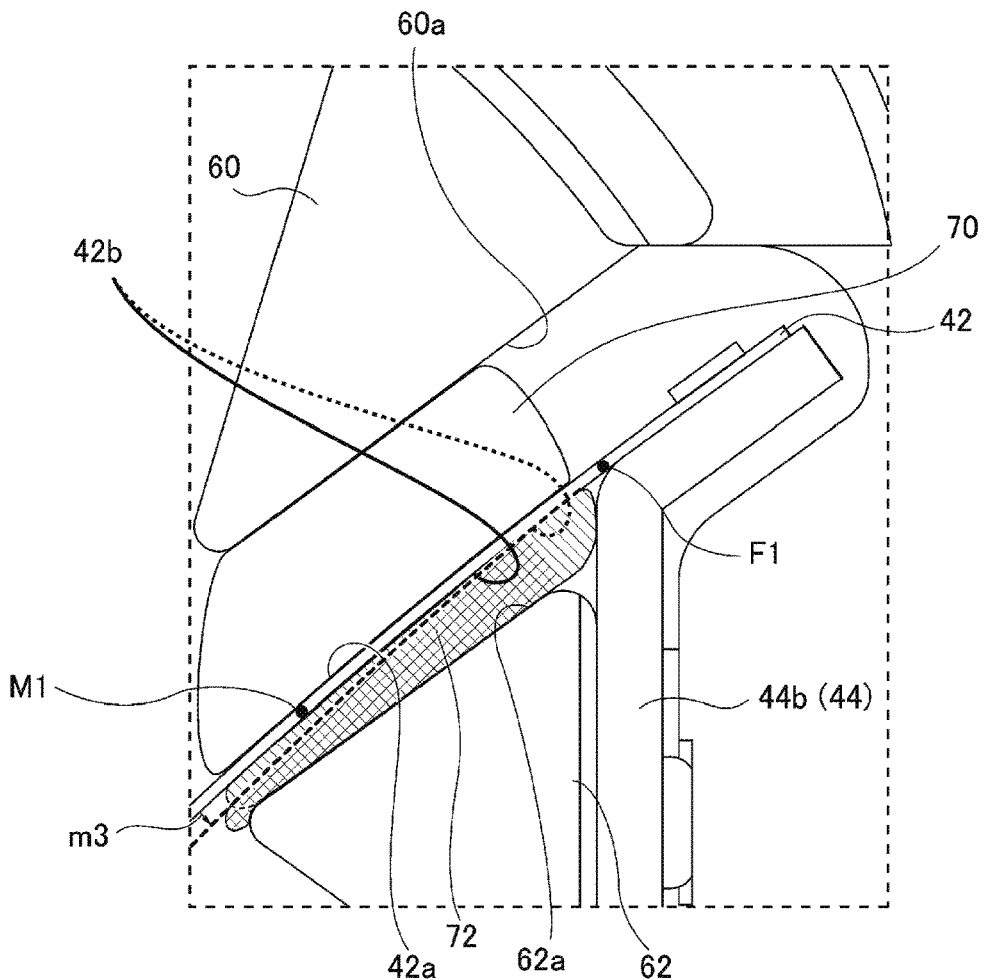

FIGS. 7A and 7B are diagrams for explaining a state of the first deformable part 72 while the motor 10 is being driven. FIG. 7A is a plan view of the bracket 40 viewed from the frame 20 side. FIG. 7B is an enlarged view of a dotted line region A2 of FIG. 7A.

Note that, in FIG. 7A, the sheet metals 33a of the commutator 33 provided in the armature 30 are also shown.

In FIG. 7A, as in FIG. 6A, the root of the conductive brush 42 where the conductive brush 42 is not supported by the terminal part 44 is shown as position F1. The part of the conductive brush 42 in contact with the commutator 33 is shown as position F11.

Like the second deformable part 70, the first deformable part 72 is provided at the center part at least in including the center (see position M1) of the conductive brush 42 between the root of the conductive brush 42 and the part of the conductive brush 42 in contact with the commutator 33 (between position F1 and position F11).

Here, the length between the root of the conductive brush 42 and the part of the conductive brush 42 in contact with the commutator 33 (between position F1 and position F11) is represented as L. Then, like the second deformable part 70, the first deformable part 72 is in contact with at least a range of greater than or equal to L/4 of the first surface 42b of the conductive brush 42 including the position of the center (position M1) between the root of the conductive brush 42 and the part of the conductive brush 42 in contact with the commutator 33. The first deformable part 72 is more desirably in contact with at least a range of greater than or equal to L/3 of the first surface 42b.

In this manner, it is possible to effectively suppress vibration by at least providing the first deformable part 72 in the range including position M1 where acceleration due to vibration is the greatest. Hereinafter, a state where the first deformable part 72 suppresses vibration is specifically described below with reference to FIGS. 7A and 7B.

When the motor 10 is driven and the conductive brush 42 vibrates, for example, as shown in FIG. 7B, the first surface 42b of the conductive brush 42 is displaced from a position indicated by a solid line to a position indicated by a dotted line as indicated by an arrow m3.

At this point, the first deformable part 72 is deformed in response to the movement of the conductive brush 42.

Specifically, as shown in FIG. 7B, the shape of the first deformable part 72 changes from a state of hatching to a state of cross-hatching according to the movement of the conductive brush 42 indicated by the arrow m3.

Specifically, the shape of the first deformable part 72 is deformed in a direction in which the first surface 62a of the first wall part 62 extends or a direction in which the first surface 42b of the conductive brush 42 extends and toward the commutator 33.

That is, a part of the first deformable part 72 escapes (projects) to a space formed between the first surface 42b of the conductive brush 42 and the first surface 62a of the first wall part 62 where the first deformable part 72 does not exist.

The change in shape is a phenomenon caused by the first deformable part 72 being in contact with and sandwiched by both the first surface 42b of the conductive brush 42 and the first surface 62a of the first wall part 62.

That is, even if the first deformable part 72 is in contact with the first surface 42b of the conductive brush 42, if the first surface 62a side of the first wall part 62 is free, a compression force is not applied to the first deformable part 72. Therefore, the change in shape of the first deformable part 72 is extremely small.

As the first deformable part 72 is compressed and the shape of the first deformable part 72 changes, a reaction force acts on the conductive brush 42 to stop the movement of the conductive brush 42. Therefore, the movement of the conductive brush 42 is suppressed.

On the other hand, when the conductive brush 42 moves oppositely, that is, when the first surface 42b of the conductive brush 42 tends to move in a direction opposite to the direction of the arrow m3 from the position of the dotted line to the position indicated by the solid line shown in FIG. 7B, the shape of the first deformable part 72 changes.

Specifically, the shape of the first deformable part 72 deforms in a direction in which the first surface 62a of the first wall part 62 extends or a direction in which the first surface 42b of the conductive brush 42 extends, and toward the root F1 of the conductive brush 42.

That is, a part of the first deformable part 72 returns to a space formed between the first surface 42b of the conductive brush 42 and the first surface 62a of the first wall part 62 where the first deformable part 72 is present.

Since the first deformable part 72 is not an elastic body such as a spring, the first deformable part 72 does not immediately return to an original volume with an elastic force of the first deformable part 72. The change of the shape of the first deformable part 72 at the time when the conductive brush 42 is about to move to the position indicated by the solid line is mainly caused by a force generated by a bend of the conductive brush 42 (a restoring force).

As the first deformable part 72 is pulled by the movement of the conductive brush 42 in a direction opposite to the arrow m3 and the shape of the first deformable part 72 changes, a reaction force acts on the conductive brush 42. The reaction force tends to stop the movement of the conductive brush 42 in a direction away from the first surface 62a side of the first wall part 62.

Along with the change in shape, action for absorbing (reducing) a moving force of the conductive brush 42 is simultaneously generated.

Note that the stopping action is also a phenomenon caused by the first deformable part 72 in contact with both the first surface 42b of the conductive brush 42 and the first surface 62a of the first wall part 62. If the first deformable part 72 is not in contact with the first surface 62a of the first wall part 62, the first deformable part 72 moves together with the conductive brush 42 in the same manner.

In this manner, the first deformable part 72 acts to suppress the movement of the conductive brush 42 when the conductive brush 42 tends to move from the position of the solid line to the position of the dotted line shown in FIG. 7B and also when the conductive brush 42 tends to move reversely from the position of the dotted line to the position of the solid line.

"The conductive brush 42 vibrates" means that the conductive brush 42 repeatedly moves between the position of the solid line and the position of the dotted line shown in FIG. 7B. However, as described above, the first deformable part 72 acts to suppress the movement and suppresses the vibration of the conductive brush 42 both when the conductive brush 42 moves toward the position of the solid line and toward the position of the dotted line.

Incidentally, as shown in FIG. 7B, when the first surface 42b of the conductive brush 42 moves from the position indicated by the solid line to the position indicated by the dotted line as indicated by the arrow m3, naturally, the second surface 42a of the conductive brush 42 moves in the same manner.

As described above, when the conductive brush 42 moves in this manner, the reaction force by the second deformable part 70 acts on the conductive brush 42. The reaction force tends to stop the movement of the conductive brush 42 in a direction away from the second surface 60a side of the second wall part 60. The second deformable part 70 absorbs a moving force of the conductive brush 42.

Conversely, when the first surface 42b of the conductive brush 42 moves in a direction opposite to the arrow m3 from the position of the dotted line to the position indicated by the solid line shown in FIG. 7B, naturally, the second surface 42a of the conductive brush 42 moves in the same manner.

As described above, when the conductive brush 42 moves in this manner, the reaction force by the second deformable part 70 acts on the conductive brush 42. The reaction force tends to stop the movement of the conductive brush 42. The second deformable part 70 absorbs a moving force of the conductive brush 42.

Therefore, in the present embodiment, both the first deformable part 72 and the second deformable part 70 cooperate to suppress the movement of the conductive brush 42.

Therefore, it is possible to perform higher suppression of vibration of the conductive brush 42 and greatly reduce noise.

On the other hand, in the first deformable part 72, as in the second deformable parts 70 and 71, in order to increase the shape change ratio VC, it is desirable to reduce the volume of the first deformable part 72 determined at a state before driving the motor 10.

As it is seen from FIG. 7B, like the second deformable part 70, the first deformable part 72 is provided to be in contact with both the first surface 42b of the conductive brush 42 and the first surface 62a of the first wall part 62. Therefore, the volume of the first deformable part 72 is adjusted by the distance between the first surface 42b of the conductive brush 42 and the first surface 62a of the first wall part 62.

In the first deformable part 72, as in the second deformable part 70, the length and the like of the conductive brush 42 employed varies depending on the size of the motor 10. Accordingly, the distance between the first surface 42b of the conductive brush 42 and the first surface 62a of the first wall part 62 to provide the first deformable part 72 with an appropriate volume is preferably determined based on the length of the conductive brush 42.

Here, the length from the root (see position F1 shown in FIGS. 7A and 7B) of the conductive brush 42 on the terminal part 44 side to position F11 (see FIG. 7A) where the conductive brush 42 is in contact with the commutator 33 is 1.0. Then, at least in a range where the first deformable part 72 is provided, a distance (hereinafter also referred to as second distance) between the first surface 42b of the conductive brush 42 and the first surface 62a of the first wall part 62 is desirably set to be less than or equal to 0.5 and more desirably set to less than or equal to 0.3.

The first wall part 62 is provided in the bracket main body 40a such that the second distance between the first surface 42b of the conductive brush 42 and the first surface 62a of the first wall part 62 is a predetermined distance.

Like the first distance, the second distance is obtained as follows. With the conductive brush 42 not in contact with the commutator 33 and the conductive brush 42 extending substantially straight, perpendiculars are drawn from points on the first surface 62a of the first wall part 62 to the conductive brush 42. Then, distances between the first surface 42b of the conductive brush 42 and the first surface 62a of the first wall part 62 are calculated. The second distance is the longest distance among the calculated distances.

On the other hand, if the second distance is short, the first deformable part 72 sometimes cannot be sufficiently deformed. Therefore, the second distance is desirably set to greater than or equal to 0.1 and more desirably set to greater than or equal to 0.2.

Note that, in the present embodiment, as shown in FIG. 7B, the first deformable part 72 is provided up to a position in contact with the first end part 44b of the terminal part 44. However, the first deformable part 72 does not always need to be in contact with the first end part 44b of the terminal part 44.

However, with the first deformable part 72 being in contact with the first end part 44b of the terminal part 44, an effect of preventing vibration from being transmitted to the terminal part 44 can be obtained. Therefore, the first deformable part 72 is preferably in contact with the first end part 44b of the terminal part 44.

For example, taking into account a space where the first deformable part 72 is provided, the first deformable part 72 may be provided within a range of L/3 or a range of L/4 including position M1.

(First Deformable Part 73)

As shown in FIG. 5, the bracket 40 includes a first wall part 63 provided at the bracket main body 40a. The first wall part 63 has a first surface 63a extending along a first surface 43b located at a side opposite the second surface 43a of the conductive brush 43 and toward the commutator 33 side (the center side of the bracket 40).

Note that the first surface 63a of the first wall part 63 is formed to be a surface parallel to the first surface 43b of the conductive brush 43 in a state in which the conductive brush 43 is not in contact with the commutator 33.

However, the first surface 63a of the first wall part 63 is not limited to a surface parallel to the first surface 43b of the conductive brush 43.

That is, the first surface 63a of the first wall part 63 may extend along the first surface 43b located at a side opposite the second surface 43a of the conductive brush 43 toward the commutator 33 side (the center side of the bracket 40) such that the first surface 63a of the first wall part 63 is inclined with respect to the first surface 43b of the conductive brush 43.

As shown in FIG. 5, the motor 10 includes, between the first surface 43b of the conductive brush 43 and the first surface 63a of the first wall part 63, the first deformable part 73 provided to be always in contact with (always adhere to) both of the surfaces (the first surface 43b and the first surface 63a).

Note that, as has been described for the second deformable part 70, "always in contact (always adhere)" herein does not mean that a contact (adhering) state is kept until the motor 10 becomes unusable. "Always in contact (always adhered)" means that the first deformable part 73 is always in contact with (always adhered to) both of the surfaces as long as an unusual situation does not occur during continuous use of the motor 10. Such an unusual situation may be the occurrence of peeling between the first deformable part 73 and the first surface 43b or occurrence of peeling between the first deformable part 73 and the first surface 63a "Always in contact (always adhered)" should not be understood to mean that the first deformable part 73 permanently continues to be in contact with (adhere to) both of the surfaces.

Like the first deformable part 72, the first deformable part 73 is formed of a gel. From the viewpoint of suppressing vibration, a gel having a hardness of greater than or equal to 30 and less than or equal to 70 in a type 00 hardness compliant with ASTM D 2240 can be suitably used.

Note that, in the first deformable part 73, as in the first deformable part 72, a type of the gel may be a two-part hardening type, an ultraviolet curing type, a thermosetting type, and the like and is not particularly limited.

Like the first deformable part 72, the first deformable part 73 may be formed of grease instead of a gel. In this case, from the viewpoint of suppressing vibration, it is suitable to use grease having a consistency of greater than or equal to 60 and less than or equal to 165 in grade 5 or a higher grade.

The first deformable part 73 is a part acting on the conductive brush 43 in the same manner as the first deformable part 72 acting on the conductive brush 42. Therefore, while the motor 10 is driven, the first deformable part 73 is in the same state as the state described for the first deformable part 72.

Therefore, although a detailed explanation is omitted, as shown in FIG. 7A, the first deformable part 73 is also provided at least at a center part including the center (see position M2) of the conductive brush 43 between the root of the conductive brush 43 on the terminal part 45 side and the part of the conductive brush 43 in contact with the commutator 33 (between position F2 and position F21).

Here, the length between the root of the conductive brush 43 and the part of the conductive brush 43 in contact with the commutator 33 (between position F2 and position F21) is represented as L. Then, the first deformable part 73 is in contact with at least a range of greater than or equal to L/4 of the first surface 43b of the conductive brush 43 including the position of the center (position M2) between the root of the conductive brush 43 and the part of the conductive brush 43 in contact with the commutator 33. The first deformable part 73 is more desirably in contact with at least a range of greater than or equal to L/3 of the first surface 43b.

Note that it is possible to effectively suppress vibration of the conductive brush 43 by at least providing, like the first deformable part 72, the first deformable part 73 in the range including position M2 where acceleration due to vibration is greater.

The distance between the first surface 43b of the conductive brush 43 and the first surface 63a of the first wall part 63 is desirably set as in the first deformable part 72.

Here, the length from the root (see position F2 shown in FIG. 7A) of the conductive brush 43 on the terminal part 45 side to position F21 (see FIG. 7A) where the conductive brush 43 is in contact with the commutator 33 is 1.0. Then, at least in the range where the first deformable part 73 is provided, a distance (hereinafter also referred to as second distance) between the first surface 43b of the conductive brush 43 and the first surface 63a of the first wall part 63 is preferably set to be less than or equal to 0.5 and more desirably set to less than or equal to 0.3.

The first wall part 63 is provided in the bracket main body 40a such that the second distance between the first surface 43b of the conductive brush 43 and the first surface 63a of the first wall part 63 is a predetermined distance.

The second distance is obtained as follows. With the conductive brush 43 not in contact with the commutator 33 and the conductive brush 43 extending substantially straight, perpendiculars are drawn from points on the first surface 63a of the first wall part 63 to the conductive brush 43. Then, distances between the first surface 43b of the conductive brush 43 and the first surface 63a of the first wall part 63 are calculated. Like the second distance described for the first deformable part 72, the second distance is the longest distance among the calculated distances.

On the other hand, if the second distance is short, the first deformable part 73 sometimes cannot be sufficiently deformed. Therefore, the second distance is desirably greater than or equal to 0.1 and more desirably greater than or equal to 0.2.

Note that, in the present embodiment, the first deformable part 73 is provided up to a position where the first deformable part 73 is in contact with the first end part 45b of the terminal part 45. However, the first deformable part 73 does not always need to be in contact with the first end part 45b of the terminal part 45.

However, with the first deformable part 73 being in contact with the first end part 45b of the terminal part 45, an effect of preventing vibration from being transmitted to the terminal part 45 can be obtained. Therefore, the first deformable part 73 is preferably in contact with the first end part 45b of the terminal part 45.

For example, taking into account a space where the first deformable part 73 is provided, the first deformable part 73 may be provided within a range of L/3 or a range of L/4 including position M2.

A relationship between the first deformable part 73 and the second deformable part 71 with respect to the conductive brush 43 is the same as the relationship between the first deformable part 72 and the second deformable part 70 with respect to the conductive brush 42.

Therefore, as described for the first deformable part 72, both the first deformable part 73 and the second deformable part 71 cooperate to suppress movement of the conductive brush 43.

Therefore, vibration of the conductive brush 43 can be greatly suppressed, and noise can be greatly reduced.

Incidentally, as described above, the motor 10 including the configuration described above can greatly reduce noise. Further, with the first deformable part 72 and the second deformable part 70, it is possible to suppress an occurrence of a phenomenon in which the conductive brush 42 instantly separates from the commutator 33 due to an influence of vibration or the like.

Accordingly, a spark is suppressed from occurring between the commutator 33 and the conductive brush 42. It is possible to greatly reduce wear of the conductive brush 42.

Similarly, with the first deformable part 73 and the second deformable part 71, it is possible to suppress an occurrence of a phenomenon in which the conductive brush 43 instantly separates from the commutator 33 due to an influence of vibration or the like. A spark is suppressed from occurring between the commutator 33 and the conductive brush 43. It is possible to greatly reduce wear of the conductive brush 43.

Therefore, the life of the conductive brush 42 and the conductive brush 43 is extended. The life of the motor 10 can also be greatly extended.

Second Embodiment

A second embodiment of the present disclosure is described with reference to FIG. 8.

In the second embodiment, a basic configuration is the same as the basic configuration in the first embodiment. The second embodiment is different from the first embodiment only in the configuration of the bracket 40.

Therefore, the bracket 40 in the second embodiment is mainly described below. Explanation is sometimes omitted concerning similarities to the first embodiment.

Figure 8:
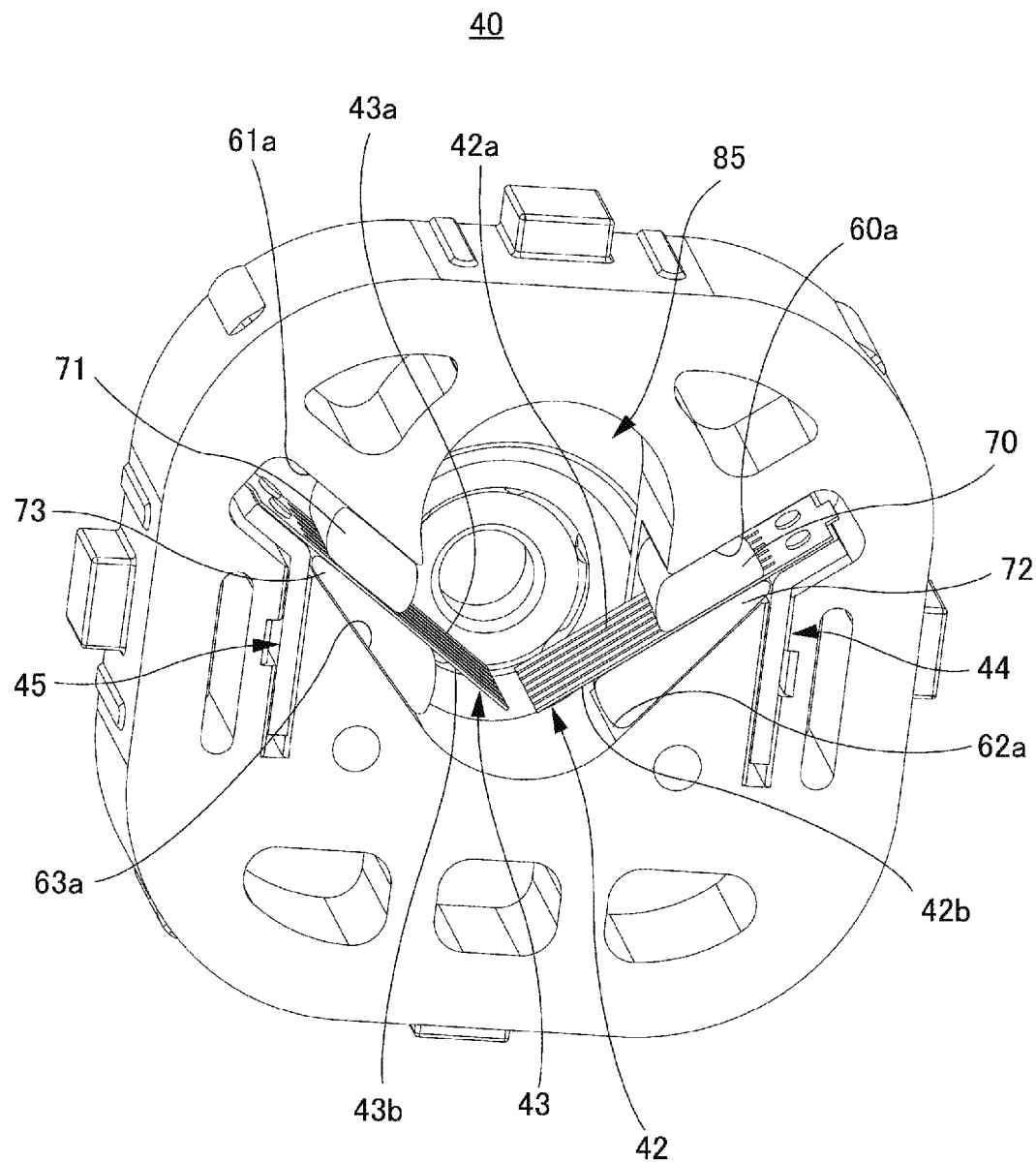
FIG. 8 is a perspective view of a bracket according to a second embodiment of the present disclosure.

In the bracket 40 in the second embodiment, as shown in FIG. 8, the bracket main body 40a and the bearing plate 40b in the first embodiment are integrally formed.

In the first embodiment, as shown in FIGS. 4 and 5, the first wall parts 62 and 63 and the second wall parts 60 and 61 are separately formed.

On the other hand, in the second embodiment, as shown in FIG. 8, one concave part 85 is formed in the bracket 40 having large thickness. The first surfaces 62a and 63a, the second surfaces 60a and 61a, and the like are integrally configured by the inner surface (hereinafter referred to as inner wall surface) of the concave part 85.

In this case, parts of the concave part 85 configuring the first surfaces 62a and 63a and the second surfaces 60a and 61a are the first wall parts 62 and 63 and the second wall parts 60 and 61 in the first embodiment.

Note that, in the second embodiment, the first surface 62a configured by a part of the inner wall surface of the concave part 85 of the bracket 40 is formed as an inclined surface. The distance to the inclined surface from the first surface 42b of the conductive brush 42 increases toward the commutator 33 side (the center side of the bracket 40), with respect to the first surface 42b of the conductive brush 42.

For the first surface 62a formed as the inclined surface in this manner, i.e., the distance to the inclined surface from the first surface 42b of the conductive brush 42 increases, it is also possible to draw perpendiculars from the first surface 62a to the first surface 42b of the conductive brush 42. The distance between the first surface 42b of the conductive brush 42 and the first surface 62a is desirably determined as the second distance described in the first embodiment.

Similarly, the first surface 63a configured by a part of the inner wall surface of the concave part 85 of the bracket 40 is formed as an inclined surface. The distance to the inclined surface from the first surface 43b of the conductive brush 43 increases toward the commutator 33 side (the center side of the bracket 40), with respect to the first surface 43b of the conductive brush 43.

In the first surface 63a, as in the first surface 62a, the distance between the first surface 43b of the conductive brush 43 and the first surface 63a is desirably set to the second distance described in the first embodiment.

As shown in FIG. 8, as in the first embodiment, the first deformable part 72 always in contact with (always adhered to) the first surface 62a formed with the inner wall surface of the concave part 85 and the first surface 42b of the conductive brush 42 is provided between the first surface 62a formed with the inner wall surface of the concave part 85 and the first surface 42b of the conductive brush 42.

As in the first embodiment, the first deformable part 73 always in contact with (always adhered to) the first surface 63a formed with the inner wall surface of the concave part 85 and the first surface 43b of the conductive brush 43 is provided between the first surface 63a formed with the inner wall surface of the concave part 85 and the first surface 43b of the conductive brush 43.

Further, the second deformable part 70 always in contact with (always adhered to) the second surface 60a configured by the inner wall surface of the concave part 85 and the second surface 42a of the conductive brush 42 is provided between the second surface 60a configured by the inner wall surface of the concave part 85 and the second surface 42a of the conductive brush 42.

In addition, the second deformable part 71 always in contact with (always adhered to) the second surface 61a configured by the inner wall surface of the concave part 85 and the second surface 43a of the conductive brush 43 is provided between the second surface 61a configured by the inner wall surface of the concave part 85 and the second surface 43a of the conductive brush 43.

With such a configuration, as in the first embodiment, vibration of the conductive brush 42 and the conductive brush 43 is greatly suppressed, and noise can be greatly suppressed.

Note that "always in contact (always adhered)" in the second embodiment should be understood as the same meaning as the meaning described in the first embodiment.

That is, "always in contact (always adhered)" means that the second deformable part 71 is always in contact with (always adhered to) the second surfaces as long as an unusual situation such as occurrence of peeling does not occur during usage of the motor 10. In other words, it should not be understood that "always in contact (always adhered)" means that the second deformable part 71 permanently continues to be in contact with (adhere to) the second surfaces.

Third Embodiment

A third embodiment of the present disclosure is described with reference to FIG. 9.

In the third embodiment, a basic configuration is the same as the basic configuration in the first embodiment. The third embodiment is different from the first embodiment only in the configurations of the first wall parts 62 and 63 and the second wall parts 60 and 61 of the bracket 40.

Therefore, in the following explanation, the first wall parts 62 and 63 and the second wall parts 60 and 61 of the bracket 40 in the third embodiment are mainly described. Explanation is sometimes omitted concerning similarities to the first embodiment.

Figure 9:
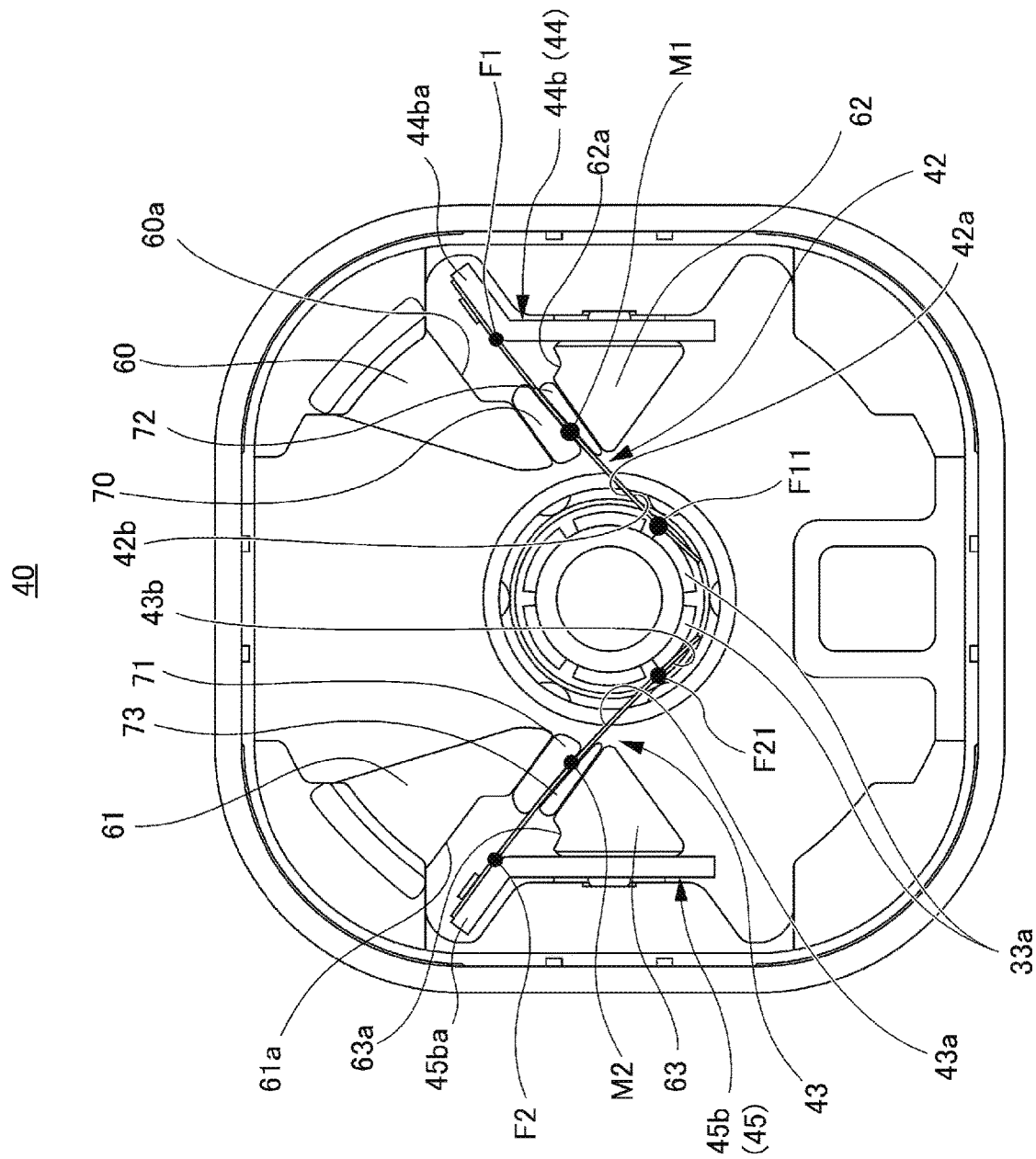
FIG. 9 is a plan view of a bracket according to a third embodiment of the present disclosure viewed from a frame side.

FIG. 9 is a plan view of the bracket 40 in the third embodiment viewed from the frame 20 side.

Note that, in FIG. 9, the sheet metals 33a of the commutator 33 provided in the armature 30 are also shown.

As shown in FIG. 9, in the first wall part 62 in the third embodiment, a part of the first surface 62a corresponding to the center part including the center (see position M1) of the first surface 42b of the conductive brush 42 is located at a position closer to the first surface 42b of the conductive brush 42 than other parts.

Similarly, in the second wall part 60 in the third embodiment, a part of the second surface 60a corresponding to the center part including the center (see position M1) of the second surface 42a of the conductive brush 42 is located at a position closer to the second surface 42a of the conductive brush 42 than the other parts.

Consequently, it is possible to reduce the volume of the first deformable part 72 and the second deformable part 70 at positions corresponding to the center part while keeping the space on the side where the one end part 44ba of the terminal part 44 is housed large.

Accordingly, it is possible to improve workability of, for example, attachment work of the terminal part 44 while improving an effect by a change in the shape of the first deformable part 72 and the second deformable part 70.

Similarly, in the first wall part 63 in the third embodiment, a part of the first surface 63a corresponding to the center part including the center (see position M2) of the first surface 43b of the conductive brush 43 is located at a position closer to the first surface 43b of the conductive brush 43 than other parts.

In the second wall part 61 in the third embodiment, a part of the second surface 61a corresponding to the center part including the center (see position M2) of the second surface 43a of the conductive brush 43 is located at a position closer to the second surface 43a of the conductive brush 43 than the other parts.

Therefore, it is possible to reduce the volume of the first deformable part 73 and the second deformable part 71 at positions corresponding to the center part while keeping the space on the side where the one end part 45ba of the terminal part 45 is housed large.

Accordingly, it is possible to improve workability of, for example, attachment work of the terminal part 45 while improving an effect by a change in the shape of the first deformable part 73 and the second deformable part 71.

Note that only the parts of the first surface 62a of the first wall part 62 and the first surface 63a of the first wall part 63 corresponding to the center parts of the conductive brush 42 and the conductive brush 43 may be formed to be close to the conductive brush 42 and the conductive brush 43.

Conversely, only the parts of the second surface 60a of the second wall part 60 and the second surface 61a of the second wall part 61 corresponding to the center parts of the conductive brush 42 and the conductive brush 43 may be formed to be close to the conductive brush 42 and the conductive brush 43.

Fourth Embodiment

A fourth embodiment of the present disclosure is described with reference to FIG. 10.

In the fourth embodiment, a basic configuration is the same as the basic configuration in the first embodiment. The fourth embodiment is different from the first embodiment only in the configurations of the first deformable parts 72 and 73 and the second deformable parts 70 and 71.

Therefore, in the following description, the first deformable parts 72 and 73 and the second deformable parts 70 and 71 in the fourth embodiment are mainly described. Description is sometimes omitted concerning similarities to the first embodiment.

Figure 10:
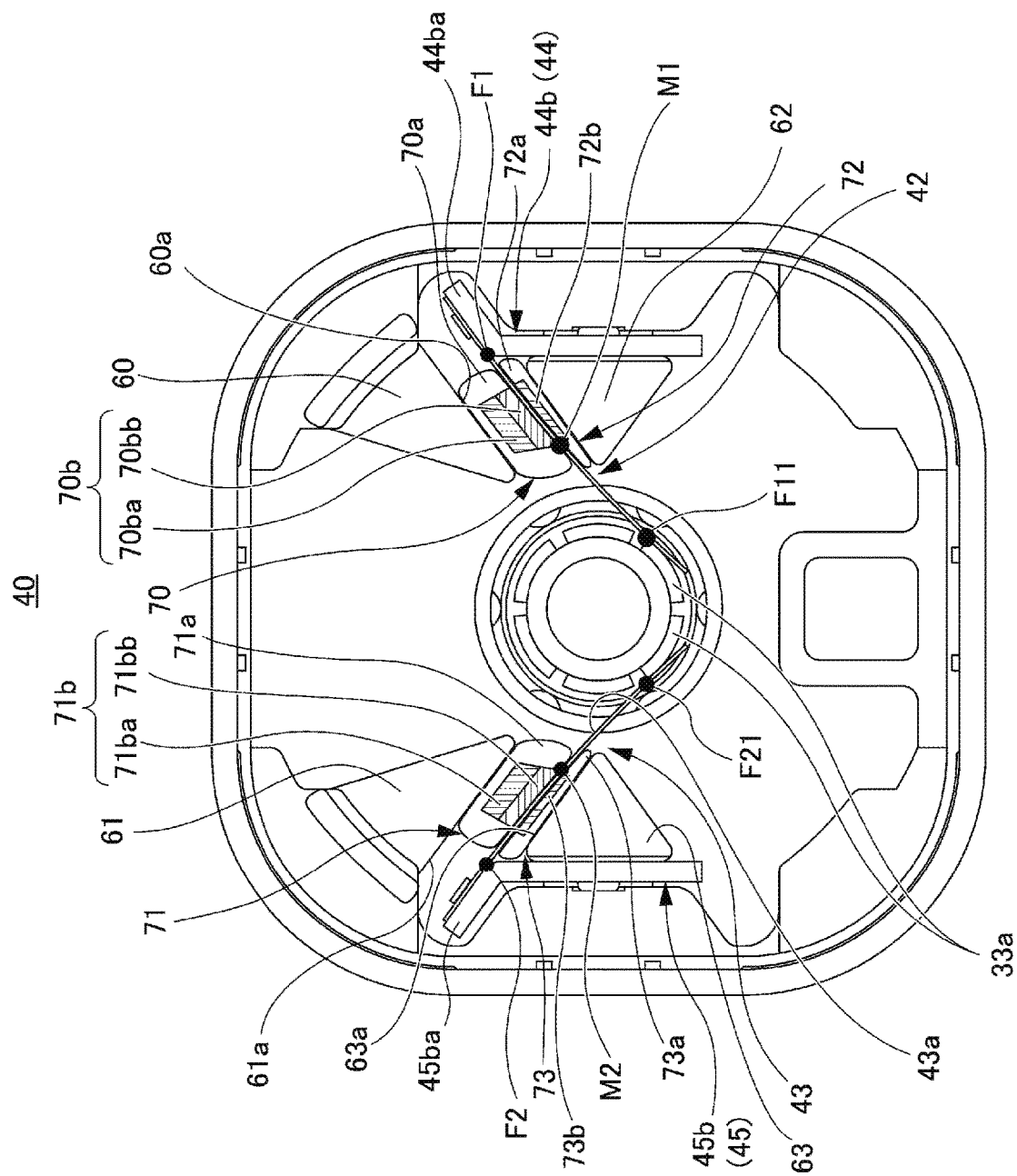
FIG. 10 is a plan view of a bracket according to a fourth embodiment of the present disclosure viewed from a frame side.

FIG. 10 is a plan view of the bracket 40 in the fourth embodiment viewed from the frame 20 side.

Note that, in FIG. 10, the sheet metals 33a of the commutator 33 provided in the armature 30 are also shown.

As shown in FIG. 10, the first deformable part 72 in the fourth embodiment includes a second resin part 72b formed of a single type of resin in addition to a part 72a formed of a gel.

Specifically, the second resin part is formed of a single type of rubber selected from types of rubber having a rubber hardness compliant with JIS K6253 (shore A hardness) of greater than or equal to 25 and less than or equal to 60.

By configuring the first deformable part 72 to include not only a gel but also a resin in this manner, it is possible to realize the first deformable part 72 that can obtain an overall vibration damping effect corresponding to a resonance characteristic of the conductive brush 42, a perfect circular shape of the commutator 33, and the like.

Like the first deformable part 72, the second deformable part 70 in the fourth embodiment includes a first resin part 70b formed of a resin in addition to a part 70a formed of a gel.

However, the first resin part 70b includes a resin part 70ba formed of a single type of resin and a resin part 70bb formed of a resin different from the resin part 70ba.

That is, the first resin part 70b is formed of a different plurality of types of resins (in this example, two different types of resins).

The resin part 70ba and the resin part 70bb are also formed of rubber selected from types of rubber having a rubber hardness compliant with JIS K6253 (shore A hardness) of greater than or equal to 25 and less than or equal to 60.

When the plurality of different types of resins are used as in the first resin part 70b, it is easier to obtain the overall vibration damping effect corresponding to a resonance characteristic of the conductive brush 42, a perfect circular shape of the commutator 33, and the like described concerning the first deformable part 72.

Note that, in the present embodiment, the second resin part 72b formed of the single type of resin is provided in the first deformable part 72 and the first resin part 70b formed of the plurality of different types of resins is provided in the second deformable part 70. However, this relationship may be opposite.

That is, a first resin part formed of a different plurality of types of resin may be provided in the first deformable part 72 and a second resin part formed of a single type of resin may be provided in the second deformable part 70.

On the other hand, like the first deformable part 72, the first deformable part 73 includes a second resin part 73b formed of a single type of resin in addition to a part 73a formed of a gel.

Like the second deformable part 70, the second deformable part 71 includes, in addition to a part 71a formed of a gel, a first resin part 71b including a resin part 71ba formed of a single type of resin and a resin part 71bb formed of resin different from the resin part 71ba.

Note that the second resin part 73b, the resin part 71ba, and the resin part 71bb are also formed of rubber selected from types of rubber having a rubber hardness compliant with JIS K6253 (shore A hardness) of greater than or equal to 25 and less than or equal to 60.

Therefore, on the conductive brush 43 side, as described concerning the conductive brush 42 side, it is possible to obtain a comprehensive damping effect of vibration corresponding to a resonance characteristic of the conductive brush 43, a perfect circular shape of the commutator 33, and the like.

Note that, in the present embodiment, the second resin part 73b formed of the single type of resin is provided in the first deformable part 73 and the first resin part 71b formed of the plurality of different types of resins is provided in the second deformable part 71. However, a first resin part formed of a plurality of different types of resins may be provided in the first deformable part 73 and a second resin part formed of a single type of resin may be provided in the second deformable part 71.

As described in the first embodiment, the parts 70a, 71a, 72a, and 73a formed of the gel may be formed of grease instead of the gel.

A variant 1 of the second embodiment of the present disclosure is described with reference to FIG. 11.

Figure 11:
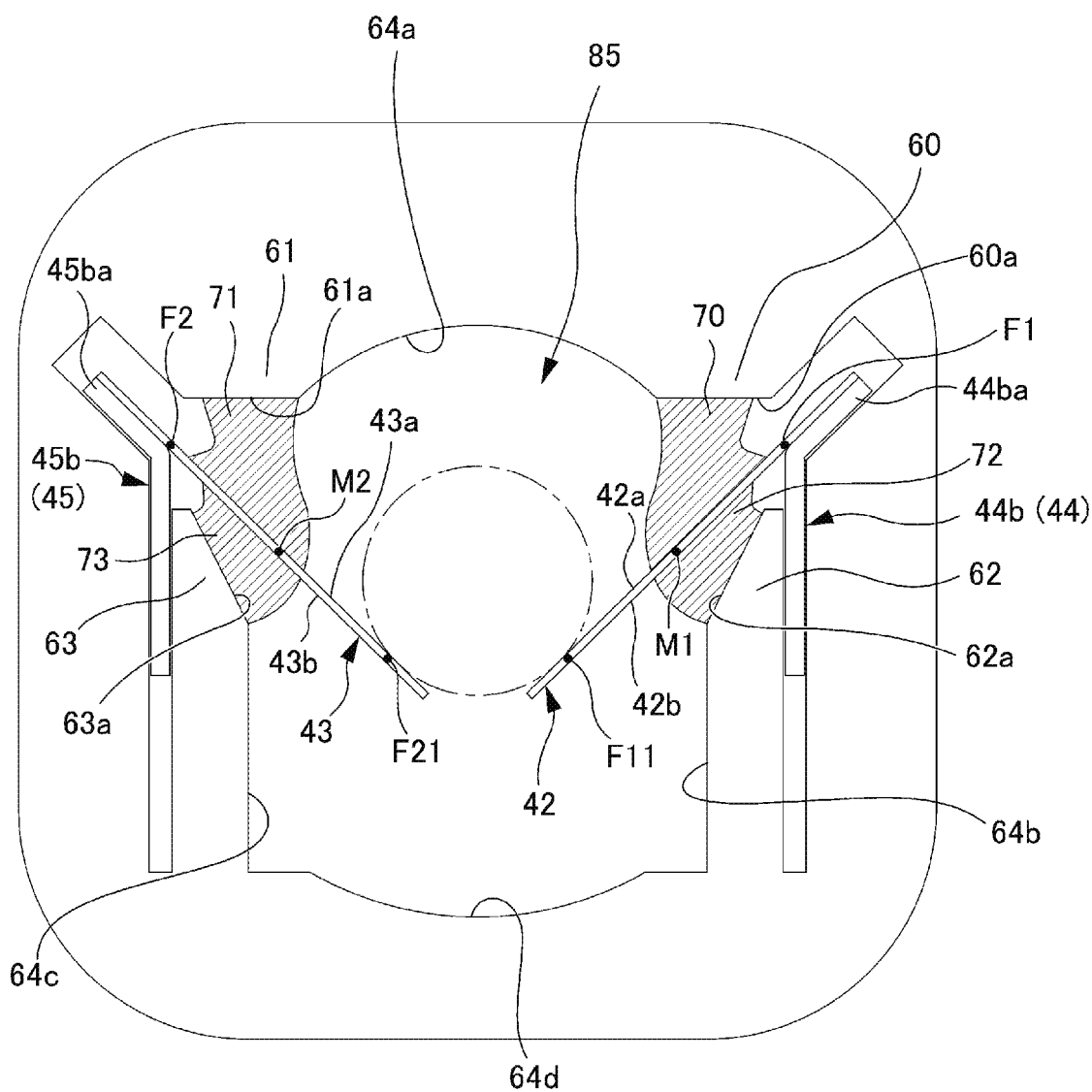
FIG. 11 is a diagram for explaining a variant 1 of the second embodiment.

Note that, in FIG. 11, the position of the sheet metals 33a of the commutator 33 is schematically indicated by a circle of a dash-dot line shown on the center side.

In the variant 1, a basic configuration is the same as the basic configuration in the second embodiment. However, the variant 1 is different from the second embodiment in the shape of the concave part 85 of the bracket 40.

Specifically, both the first surface 62a of the first wall part 62 and the second surface 60a of the second wall part 60 configured by parts of the inner wall surface of the concave part 85 of the bracket 40 are formed as inclined surfaces. The distances to the inclined surfaces from the first surface 42b and the second surface 42a of the conductive brush 42 increase toward the commutator 33 side (the center side of the bracket 40), with respect to the conductive brush 42.

Both the first surface 63a of the first wall part 63 and the second surface 61a of the second wall part 61 configured by parts of the inner wall surface of the concave part 85 of the bracket 40 are formed as inclined surfaces. The distances to the inclined surfaces from the first surface 43b and the second surface 43a of the conductive brush 43 increase toward the commutator 33 side (the center side of the bracket 40), with respect to the conductive brush 43.

Therefore, the widths of the first deformable part 72, the first deformable part 73, the second deformable part 70, and the second deformable part 71 increase at positions closer to the commutator 33 side.

On the other hand, the commutator 33 sides of the second surface 60a of the second wall part 60 and the second surface 61a of the second wall part 61 are connected by a third surface 64a drawing an arc having a radius of curvature greater than an arc in the second embodiment shown in FIG. 8.

A fourth surface 64b connected to the commutator 33 side of the first surface 62a of the first wall part 62 is provided.

The fourth surface 64b is provided to extend in an extending direction of a part other than the one end part 44ba of the first end part 44b of the terminal part 44.

Similarly, a fourth surface 64c connected to the commutator 33 side of the first surface 63a of the first wall part 63 is provided.

The fourth surface 64c is provided to extend in an extending direction of a part other than the one end part 45ba of the first end part 45b of the terminal part 45.

An end part located on the opposite side of the first surface 62a side of the fourth surface 64b and an end part located on the opposite side of the first surface 63a side of the fourth surface 64c are connected by a fifth surface 64d including an arcuate part at the center.

Note that the fifth surface 64d is formed along a direction orthogonal to the fourth surface 64b and the fourth surface 64c.

The concave part 85 including the third surface 64a, the fourth surface 64b, the fourth surface 64c, and the fifth surface 64d may have a space of the concave part broader than the concave part 85 in the second embodiment shown in FIG. 8.

Note that, in the variant 1, as described in the first embodiment, the first deformable part 72 and the second deformable part 70 are desirably provided at least at the center part including the center (see position M1) of the conductive brush 42 between the root of the conductive brush 42 and the part of the conductive brush 42 in contact with the commutator 33 (between position F1 and position F11).

As described in the first embodiment, the first deformable part 73 and the second deformable part 71 are desirably provided at least at the center part including the center (see position M2) of the conductive brush 43 between the root of the conductive brush 43 and the part of the conductive brush 43 in contact with the commutator 33 (between position F2 and position F21).

A variant 2 of the second embodiment of the present disclosure is described with reference to FIG. 12.

Figure 12:
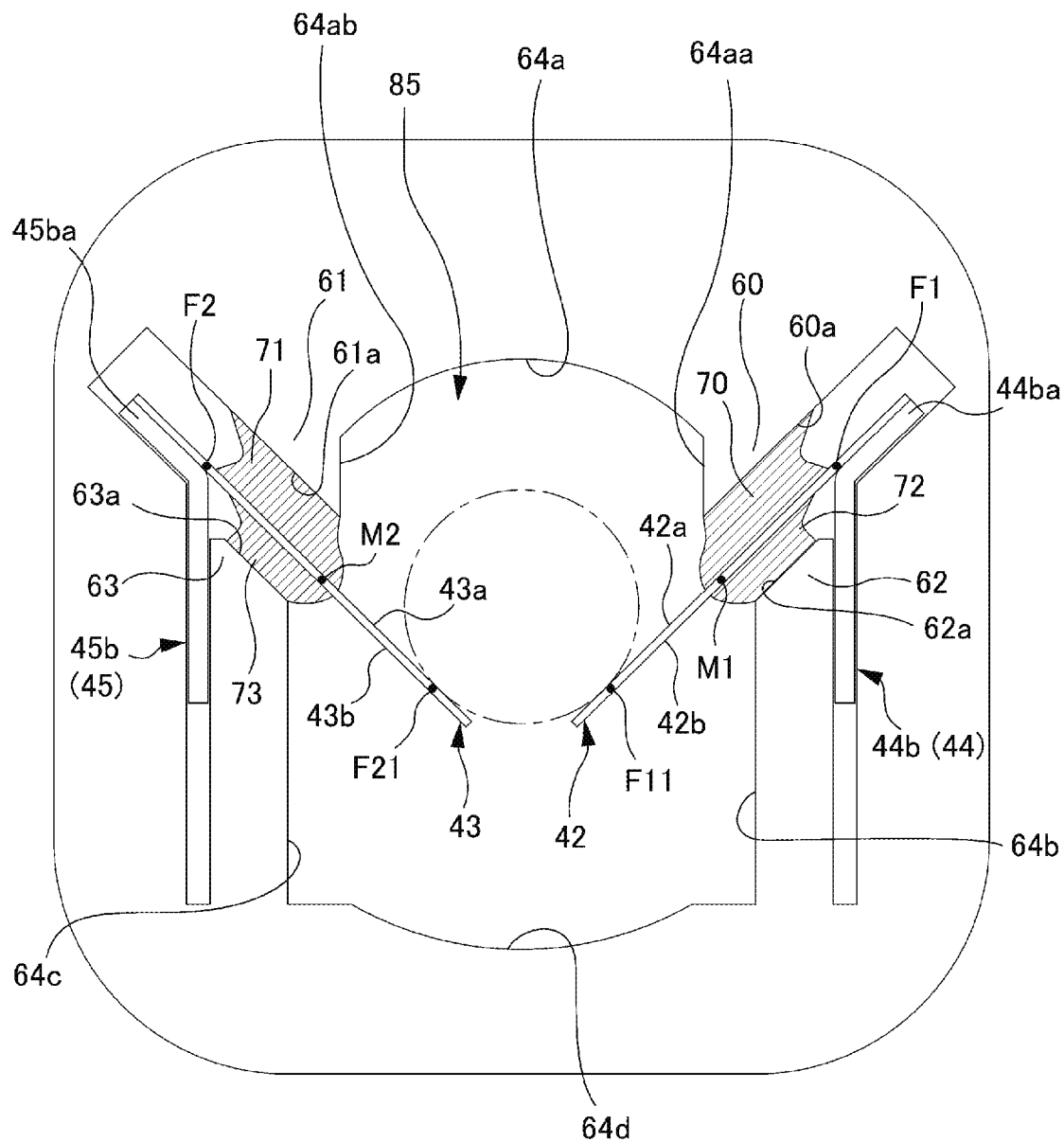
FIG. 12 is a diagram for explaining a variant 2 of the second embodiment.

Note that, in FIG. 12, the position of the sheet metals 33a of the commutator 33 is schematically indicated by a circle of a dash-dot line shown on the center side.

The variant 2 is different from the variant 1 in that the first surface 62a of the first wall part 62 and the second surface 60a of the second wall part 60 are surfaces extending along the conductive brush 42 and substantially parallel to a direction in which the conductive brush 42 extends.

The variant 2 is also different from the variant 1 in that the first surface 63a of the first wall part 63 and the second surface 61a of the second wall part 61 are surfaces extending along the conductive brush 43 and substantially parallel to a direction in which the conductive brush 43 extends.

The third surface 64a and the second surface 60a are connected by a sixth surface 64aa extending in an extending direction of a part other than the one end part 44ba of the first end part 44b of the terminal part 44. The third surface 64a and the second surface 61a are connected by a sixth surface 64ab extending in an extending direction of a part other than the one end part 45ba of the first end part 45b of the terminal part 45.

Note that, in the variant 2, as described in the first embodiment, the first deformable part 72 and the second deformable part 70 are desirably provided at least at the center part including the center (see position M1) of the conductive brush 42 between the root of the conductive brush 42 and the part of the conductive brush 42 in contact with the commutator 33 (between position F1 and position F11).

As described in the first embodiment, the first deformable part 73 and the second deformable part 71 are desirably provided at least at the center part including the center (see position M2) of the conductive brush 43 between the root of the conductive brush 43 and the part of the conductive brush 43 in contact with the commutator 33 (between position F2 and position F21).

As it is seen from the second embodiment and the variant 1 and the variant 2 of the second embodiment, the shape of the concave part 85 is not particularly limited as long as the first deformable part 72, the first deformable part 73, the second deformable part 70, and the second deformable part 71 are appropriately formed.

A variant 3 of the second embodiment of the present disclosure is described with reference to FIG. 13.

Figure 13:
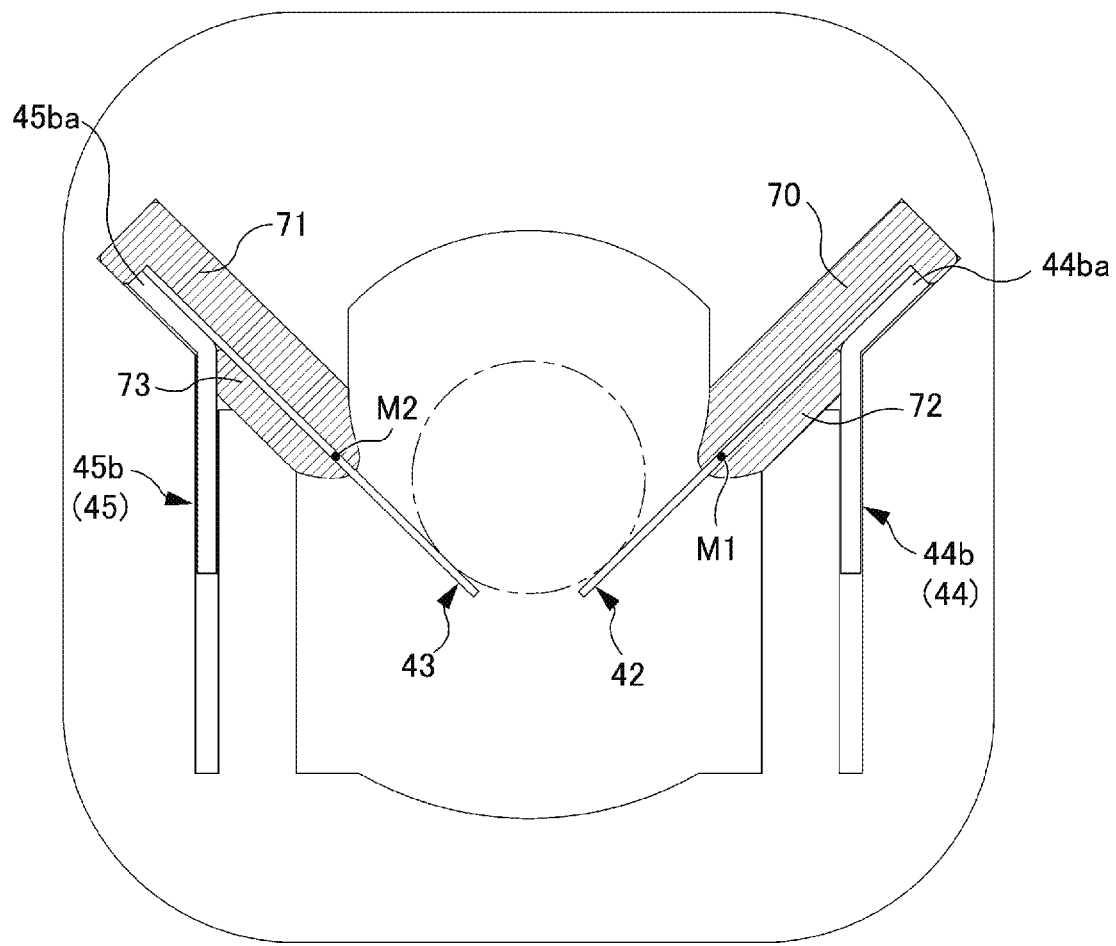
FIG. 13 is a diagram for explaining a variant 3 of the second embodiment.

Note that, in FIG. 13, the position of the sheet metals 33a of the commutator 33 is schematically indicated by a circle of a dash-dot line shown on the center side.

The variant 3 is different from the variant 2 in that the second deformable part 70 is in contact with the terminal part 44 up to the one end part 44ba of the first end part 44b of the terminal part 44.

The variant 3 is also different from the variant 2 in that the first deformable part 72 is in contact with the terminal part 44 up to a part other than the one end part 44ba of the first end part 44b of the terminal part 44.

Since the second deformable part 70 and the first deformable part 72 are provided to be in contact with the terminal part 44 in this manner, it is possible to sufficiently suppress braking of the conductive brush 42 and suppress vibration of the terminal part 44.

Similarly, the variant 3 is different from the variant 2 in that the second deformable part 71 is in contact with the terminal part 45 up to the one end part 45ba of the first end part 45b of the terminal part 45.

The variant 3 is also different from the variant 2 in that the first deformable part 73 is in contact with the terminal part 45 up to a part other than the one end part 45ba of the first end part 45b of the terminal part 45.

Since the second deformable part 71 and the first deformable part 73 are provided to be in contact with the terminal part 45 in this manner, it is possible to sufficiently suppress braking of the conductive brush 43 and suppress vibration of the terminal part 45.

The present disclosure is described above on the basis of the embodiments. However, the present disclosure is not limited to the embodiments. It goes without saying that various changes in a range not departing from the spirit of the present disclosure are possible.

Therefore, embodiments obtained by performing the various changes in the range not departing from the spirit of the present disclosure are also included in the technical scope of the present disclosure. For those skilled in the art, this is evident from the description of claims.

What is claimed is:

1. A motor comprising:
   a commutator;
   a conductive brush including a first surface and an opposite second surface, the second surface having a part in contact with the commutator;
   a bracket including a first wall part; and
   a first deformable part being in contact with the first surface of the conductive brush and a surface of the first wall part in a circumferential direction, wherein
   the first deformable part is formed with a gel having a volume, resin having a volume or grease having a volume,
   the part of the conductive brush in contact with the commutator extends along a longitudinal extent of the conductive brush toward the commutator,
   the first deformable part is in contact with a center part of the first surface of the conductive brush between the part of the conductive brush in contact with the commutator and a root of the conductive brush,
   a part at the surface of the first wall part corresponds to the center part of the first surface of the conductive brush, the part at the surface of the first wall part being inclined with respect to the first surface of the conductive brush, and
   the part at the surface of the first wall part is closer to the first surface of the conductive brush on a commutator side of the conductive brush than to the first surface of the conductive brush on a root side of the conductive brush.

2. The motor according to claim 1, comprising a second deformable part, wherein
   the second deformable part is formed with a gel having a volume, resin having a volume or grease having a volume, and
   the bracket includes a second wall part, and
   the second deformable part being in contact with the second surface of the conductive brush and a surface of the second wall part in the circumferential direction, wherein
   the second deformable part is in contact with a center part of the second surface of the conductive brush between the part of the conductive brush in contact with the commutator and a root of the conductive brush, and a part at the second wall part corresponds to the center part of the second surface of the conductive brush, the part at the second wall part being inclined with respect to the second surface of the conductive brush, and the part at the second wall part corresponding to the center part of the second surface of the conductive brush is closer to the second surface of the conductive brush on the commutator side of the conductive brush than the second surface of the conductive brush on the root side of the conductive brush.

3. The motor according to claim 2, wherein, when a length between the root of the conductive brush and the part of the conductive brush in contact with the commutator is represented as L, the second deformable part is in contact with a range of greater than or equal to L/4 of the second surface of the conductive brush including a position at a center between the root of the conductive brush and the part of the conductive brush in contact with the commutator.

4. The motor according to claim 1, wherein the first deformable part or the second deformable part includes a plurality of resins.

5. The motor according to claim 4, wherein the first deformable part or the second deformable part not including the first resin part includes a second resin part formed with a single type of resin.

6. The motor according to claim 4, wherein the plurality of resins includes the gel or the grease.

7. The motor according to claim 4, wherein the plurality of resins includes a rubber.

8. A rotary apparatus comprising the motor according to claim 1.

9. An air condition system comprising:
a louver driven by the rotary apparatus according to claim 8.

10. A vehicle comprising the air condition system according to claim 9.

11. A vehicle comprising the motor according to claim 1.

12. The motor according to claim 1, wherein
a terminal part is arranged at the bracket,
an end part of the conductive brush is arranged on the side opposite to the commutator side in a radial direction,
the end part of the conductive brush is fixed to the terminal part, and
the conductive brush extends in the radial direction between the part of the conductive brush contacting with the commutator and the end part of the conductive brush.

13. The motor according to claim 1, wherein one of the first deformable part and the second deformable part includes a restoring force in the circumferential direction.

14. The motor according to claim 1, wherein, when a length between the root of the conductive brush and the part of the conductive brush in contact with the commutator is represented as L, the first deformable part is in contact with a range of greater than or equal to L/4 of the first surface of the conductive brush including a position at a center between the root of the conductive brush and the part of the conductive brush in contact with the commutator.

15. The motor according to claim 1, comprising:
a frame, and
a magnet.

* * * * *